United States Patent [19]
Hoshiya et al.

[11] Patent Number: 6,090,008
[45] Date of Patent: Jul. 18, 2000

[54] COAST DOWNSHIFT CONTROL APPARATUS FOR A VEHICULAR AUTOMATIC TRANSMISSION

[75] Inventors: Kazumi Hoshiya, Gotenba; Hidehiro Oba, Numazu; Hiroatsu Endo, Susono, all of Japan

[73] Assignee: Toyota Jidosha Kabushiki Kaisha, Toyota, Japan

[21] Appl. No.: 09/267,777

[22] Filed: Mar. 15, 1999

[30] Foreign Application Priority Data

Mar. 31, 1998 [JP] Japan .................................. 10-087356

[51] Int. Cl.$^7$ ................................................. B60K 41/02
[52] U.S. Cl. ........................... 477/84; 477/118; 477/180; 477/124; 477/156
[58] Field of Search ............................... 477/118, 83, 84, 477/99, 109, 180, 120, 123, 124, 156

[56] References Cited

U.S. PATENT DOCUMENTS

| | | |
|---|---|---|
| 4,653,351 | 3/1987 | Downs et al. . |
| 4,671,139 | 6/1987 | Downs et al. ..................... 477/148 X |
| 5,036,729 | 8/1991 | Nitz et al. . |
| 5,441,464 | 8/1995 | Markyvech .............................. 477/109 |
| 5,445,576 | 8/1995 | Motamedi et al. .................. 477/109 X |
| 5,634,867 | 6/1997 | Mack .................................. 477/180 X |
| 5,954,776 | 9/1999 | Saito et al. ......................... 447/118 X |

FOREIGN PATENT DOCUMENTS

| | | |
|---|---|---|
| 4-278844 | of 0000 | Japan . |
| 6-8665 | of 0000 | Japan . |

*Primary Examiner*—Charles A Marmor
*Assistant Examiner*—Ha Ho
*Attorney, Agent, or Firm*—Oblon, Spivak, McClelland, Maier & Neustadt, P.C.

[57] ABSTRACT

In a vehicular automatic transmission, a coast downshift is executed in an appropriate engine-braking state and with a light gearshift shock. While predetermined conditions for the execution of the downshift are met, an oil pressure to be fed to a clutch (c12 in FIG. 1) on the side of a gearshift output stage (a lower speed stage) is controlled, for example, in order that the input shaft speed (turbine speed01 in FIG. 1) of the automatic transmission may agree with a desired value adapted to keep the weak engine-braking state.

13 Claims, 16 Drawing Sheets

FIG.3A

| GEAR STAGE | C1 | C2 | S1 1 | S1 N | S1 3 | S2 2 | S2 N | S2 4 | S3 N | S3 R |
|---|---|---|---|---|---|---|---|---|---|---|
| 1ST SPEED STAGE | ○ |   | ○ |   |   | ▽ | ○ |   | ○ |   |
| 2ND SPEED STAGE |   | ○ | △ | ○ | ▽ | ○ |   |   | ○ |   |
| 3RD SPEED STAGE | ○ |   |   |   | ○ | △ | ○ | ▽ | ○ |   |
| 4TH SPEED STAGE |   | ○ | ○ |   | △ |   |   | ○ | ○ |   |
| REVERSE STAGE | ○ | ○ |   |   |   |   | ○ |   |   | ○ |

FIG.3B

| NO. | JUDGED GEARSHIFT STAGE | OUTPUT SHAFT R.P.M. | SYNCHRO POSITIONS |
|---|---|---|---|
| 1 | 1ST SPEED | <No1 | 1-N |
| 2 |  | ≧No1 | 1-2 |
| 3 | 2ND SPEED | <No2 | 1-2 |
| 4 |  | ≧No2 | 2-3 |
| 5 | 3RD SPEED | <No3 | 2-3 |
| 6 |  | ≧No3 | 3-4 |
| 7 | 4TH SPEED | — | 3-4 |

COAST DOWNSHIFT CONTROL APPARATUS FOR A VEHICULAR AUTOMATIC TRANSMISSION

BACKGROUND OF THE INVENTION

1. Field of the Invention

The present invention relates to a coast downshift control apparatus for a vehicular automatic transmission having a plurality of clutches, wherein a coast downshift is executed under predetermined conditions by a clutch-to-clutch gearshift based on the engagement of the clutch on the side of a gearshift output stage and the release of the clutch on the side of a preceding gearshift stage.

2. Description of the Prior Art

Owing to enhancement in the control precision of a hydraulic control system, a method wherein the upshift or downshift of an automatic transmission is realized by a so-called "clutch-to-clutch gearshift" has recently been extensively adopted.

The clutch-to-clutch gearshift is such that the desired gearshift is realized by concurrently implementing the engagement of a clutch on the side of a gearshift output stage (an incoming gearshift stage or speed stage which is to be attained from now) and the release of a clutch on the side of a preceding gearshift stage (a gearshift stage which has been attained till now).

Meanwhile, a so-called "coast downshift" is executed when a predetermined downshift (down gearshift) point is traversed in a case where the accelerator pedal of a motor vehicle has been released and where the speed thereof has lowered naturally (or with braking).

In executing the coast downshift by the clutch-to-clutch gearshift, the clutch of the preceding-gearshift-stage side is released while the clutch of the gearshift-output-stage side is being engaged (Japanese Patent Publication No. 8665/1994: U.S. Pat. No. 4,653,351, or Japanese Patent Laid-open No. 278844/1992: U.S. Pat. No. 5,036,729).

However, in consideration of a gear shifting time period, the coast downshift point must be set on a vehicle speed side higher than a downshift point which ought to be set, in order that the motor vehicle may always keep up its driven state even when decelerated somewhat suddenly.

In the general drive of the motor vehicle, accordingly, the coast downshift is executed when the vehicle speed is not sufficiently lowered yet. This has posed the problem that an excessive engine-braking force is sometimes generated after the gearshift (especially, at a low gearshift stage such as the first speed stage or the second speed stage).

Another problem has been that a shock attendant upon the gearshift tends to become heavy.

SUMMARY OF THE INVENTION

The present invention has been made in view of the problems of the prior art as stated above, and has for its object to provide a coast downshift control apparatus for a vehicular automatic transmission in which a coast downshift based on a clutch-to-clutch gearshift can be reasonably realized without generating an excessive engine-braking force and without involving a heavy gearshift shock.

The structure of the present invention as defined in Claim 1 concerns a coast downshift control apparatus for a vehicular automatic transmission having a plurality of clutches, wherein a coast downshift is executed under predetermined conditions by a clutch-to-clutch gearshift based on engagement of the clutch on a side of a gearshift output stage and release of the clutch on a side of a preceding gearshift stage. Herein, the structure comprises the following means in order to accomplish the above object:

First means judges whether or not the predetermined conditions for executing the coast downshift are satisfied. Second means sets a desired value (target value) for a predetermined parameter in order that a motor vehicle furnished with the automatic transmission may be kept in a weak engine-braking state. Third means performs during the satisfaction of the predetermined conditions a coast control in which an oil pressure to be fed to the gearshift-output-stage side clutch is controlled so that the predetermined parameter may agree with the desired value.

In the coast downshift mode, the r.p.m. (speed) of the engine of the motor vehicle is basically about to lower down to the idling r.p.m. thereof. When the clutch of the gearshift-output-stage side (engagement side) is engaged overcoming the situation, the engine r.p.m. is raised more. Accordingly, the degree of increase of engine r.p.m. can be regulated by controlling the oil pressure which is fed to the gearshift-output-stage side clutch (engagement side clutch).

The present invention notes this point, and controls the feed oil pressure of the engagement side so as to keep the state in which predetermined engine braking always acts on the motor vehicle. Therefore, while the coast downshift control is proceeding (including, for example, a case where downshifts are successively executed as the fourth speed stage→third speed stage→second speed stage→first speed stage), the motor vehicle is always subjected to the predetermined engine braking and can be kept decelerated in a stable state.

Incidentally, as the "predetermined conditions", various conditions can be concretely considered as in embodiments to be described later. Since, however, the conditions are for executing the "coast downshift", it is indispensable to satisfy, at least, the two conditions; that the degree of opening of the accelerator is equal to or less than a predetermined value (zero or near to zero), and that the vehicle speed lowers.

The coast control thus started is basically ended when the "predetermined conditions" have failed to be met by, for example, pressing the accelerator pedal. In a case where, with the "predetermined conditions" kept met, the vehicle speed lowers to stop the motor vehicle in due course, the "coast control" according to the present invention may well be continued as it is. As a result, the motor vehicle is "automatically" diverted from the weak engine-braking state into the drive state thereof at the point of time at which the input shaft r.p.m. of the automatic transmission has fallen below the synchronous r.p.m. of the first speed stage, on the other hand, the feed oil pressure of the gearshift-output-stage side clutch is controlled so as to actualize that desired value (target value) of the parameter with which the weak engine-braking state is established, so that the gearshift-output-stage side clutch can be "automatically" shifted to the full engagement.

The present invention as defined in Claim 2 has been proposed with note taken of the above point, and it consists in that, even in the state in which the desired value is not attainable any longer, the coast control is continued as it is without being suspended. However, the "continuation" is not always indispensable to the present invention, but by way of example, a "condition which is not met in the state where the desired value is unattainable" may well be included in the "predetermined conditions" so as to perform a control different from the coast control thenceforth.

Here, various methods are considered for "setting the desired value for the predetermined parameter in order to keep the motor vehicle in the weak engine-braking state". By way of example, in a case where the input shaft r.p.m. (turbine r.p.m.) of the automatic transmission is employed as the predetermined parameter, a value which is higher than engine r.p.m. by a predetermined magnitude may well be set as the desired value of the input shaft r.p.m. (Claim 3).

Also, in the case where the input shaft r.p.m. of the automatic transmission is similarly employed as the predetermined parameter, a value which is lower than the synchronous r.p.m. of the gearshift output stage by a predetermined magnitude may well be set as the desired value of the input shaft r.p.m. (Claim 4). Incidentally, the synchronous r.p.m. of the gearshift output stage is calculated in accordance with (Output shaft r.p.m. of Automatic transmission)× (Gear ratio of Gearshift output stage).

Further, in a case where the r.p.m. ratio (speed ratio) of a torque converter constituting the automatic transmission is employed as the predetermined parameter, a predetermined value which is slightly larger than 1 (one) may be set as the desired value of the r.p.m. ratio (Claim 5). Incidentally, this contrivance has the same significance as employing the input shaft r.p.m. of the automatic transmission as the predetermined parameter, and then setting a value, which is obtained by multiplying the engine r.p.m. by a predetermined magnitude, as the desired value of the input shaft r.p.m.

Meanwhile, the contrivance of the present invention as defined in Claim 6 consists, in the structure of Claim 1, in that a coast control based on the desired value is performed by the preceding-gearshift-stage side clutch since the issue of a gearshift output of the automatic transmission until the gearshift-output-stage side clutch comes to have a specific transmission torque capacity, and that it is thereafter switched over to the coast control by the gearshift-output-stage side clutch. Thus, the problems can be similarly solved. Also, especially when the gearshift output stage has changed to another gearshift stage, the changeover of the gearshift output stages can be effected more smoothly.

In the case of the clutch-to-clutch gearshift, immediately after the issue of the gearshift output, the gearshift-output-stage side clutch does not have any transmission torque capacity yet, and hence, the predetermined parameter cannot be controlled by the gearshift-output-stage side clutch so as to be kept at the desired value. In this regard, the present invention contains as its purport that "the gearshift-output-stage side (lower-speed-stage side) clutch is controlled so that the desired value may be kept". Therefore, the present invention is not especially restricted as to the sort of a control which is performed (no control may well be performed) before the gearshift-output-stage side clutch comes to have a transmission torque capacity. However, it is not excluded from the invention that, at this control stage (that is, until the gearshift-output-stage side clutch comes to have the transmission torque capacity), the predetermined parameter is controlled by the preceding-gearshift-stage side clutch so as to become the desired value. Especially in the case where the gearshift output stage has changed to the adjacent lower gearshift stage with the lowering of the vehicle speed, it is desirable that the predetermined parameter is controlled so as to be kept at the desired value in association with the higher-speed-stage side clutch (which has been feedback-controlled as the gearshift-output-stage side clutch till then), until the clutch having become the lower-speed-stage side clutch anew comes to have the transmission torque capacity. In this way, a very stable control can be realized.

The contrivance of the present invention as defined in Claim 7 consists, in the structure of Claim 1, in that, when the predetermined conditions are not satisfied any longer because of pressing the accelerator pedal of the motor vehicle, a gearshift is executed to the gearshift stage of either the current gearshift output stage or (the current gearshift output stage+one stage) whose synchronous r.p.m. exhibits a smaller difference from the current input shaft r.p.m. of the automatic transmission. Thus, the problems can be similarly solved. Also, when the "predetermined conditions" have failed to be met, the control system of the automatic transmission can be exit from the present coast control without a heavy shock.

The contrivance of the present invention as defined in Claim 8 consists, in the structure of Claim 1, in that, when the predetermined conditions are not satisfied any longer because of a new upshift having occurred, an engagement timing is learnt as to the higher-speed-stage side clutch which has been in its released state as the preceding-gearshift-stage side clutch till then and which is to be engaged again anew. Thus, the problems can be similarly solved. Also, the engagement timing of the higher-speed-stage side clutch can be accurately learnt by utilizing the end timing of the coast control.

More specifically, in the present invention, the oil pressure of the release side need not be especially controlled, and it is comparatively quickly lowered at a predetermined rate. The contrivance defined in Claim 8 has been proposed with note taken of this point. In the case where the new upshift has occurred for any reason and where the clutch having been released as the preceding-gearshift-stage side clutch till then is to be engaged again anew, the feed of the oil pressure is started from the state in which the oil pressure is not fed at all, and hence, the learning of the engagement timing of the clutch can be done very accurately.

The contrivance of the present invention as defined in Claim 9 consists, in the structure of Claim 1, in that standby pressures concerning the engagement and release of the gearshift-output-stage side clutch are learnt on the basis of the duty ratio of the clutch which is under a coast control based on the desired value. Thus, the problems can be similarly solved. Also, the standby pressures concerning the engagement and release of the gearshift-output-stage side clutch can be accurately learnt.

More specifically, in the present invention, the oil pressure of the gearshift-output-stage side is controlled in order that the weak engine-braking state may be always kept. The "weak engine-braking state" corresponds to the state in which the clutch pack of the pertinent clutch is filled up, and in which the torque capacity of only a minute torque is being transmitted. Therefore, the critical duty ratio (engagement pressure) with which the pertinent clutch has the very limit capacity can be accurately estimated by checking the degree of the duty ratio (engagement pressure) which has been actually outputted in order to keep the weak engine-braking state.

The critical duty ratio with which the clutch has the very limit capacity, is a value which has a very important significance especially as the standby pressure (the oil pressure in the case where one clutch is waiting until the opposite clutch falls into a predetermined condition) of the engagement side or release side in an ordinary upshift or downshift mode in the clutch-to-clutch gearshift.

In the coast control according to the present invention, the oil pressure is controlled to the duty ratio (engagement pressure) with which the weak engine-braking state is always kept. Therefore, the critical point (the duty ratio with which the clutch just has the transmission torque capacity) can be learnt very accurately by adjusting a "weak engine-braking component" on the basis of the duty ratio (engagement pressure).

The contrivance of the present invention as defined in Claim 10 pertains to a case where the coast downshift control apparatus for a vehicular automatic transmission as defined in Claim 3 or 4, is applied to an automatic transmission having a synchro mechanism. Herein, the contrivance of Claim 10 consists in that, when the synchronous r.p.m. of the current gearshift stage, which is calculated in accordance with (Output shaft r.p.m. of Automatic transmission)×(Gear ratio of Current gearshift output stage), has become less than the desired value with a predetermined magnitude added thereto, because of the delay of the switchover of the synchro mechanism as is ascribable to a rapid deceleration, the desired value is temporarily changed over to a desired value with which no engine braking is generated. Thus, the problems can be similarly solved. Also, even in such a case where the present invention is applied to the automatic transmission having the synchro mechanism and where a very rapid deceleration is applied, the motor vehicle can be prevented from falling into its drive state.

More specifically, in the application of the present invention to the automatic transmission having the synchro mechanism, when the switchover of the synchro mechanism has relatively delayed due to the rapid deceleration by way of example, the vehicle speed might become lower than a value equivalent to the synchronous r.p.m. of the current gearshift stage before the next gearshift output is delivered (for the reason that the next gearshift command must be inevitably issued after the switchover of the synchro mechanism). On this occasion, the motor vehicle falls temporarily into its drive state even when it is intended to control the feed oil pressure of the clutch of the gearshift-output-stage side in order that the weak engine braking may be generated. Therefore, in the case where the synchronous r.p.m. of the current gearshift stage has become less than a value obtained by adding the predetermined magnitude to the desired value, because of the delay of the switchover of the synchro mechanism attributed to the rapid deceleration, the "desired value for generating the weak engine braking" is temporarily changed over to the "desired value for bringing the motor vehicle into the neutral state". As a result, the motor vehicle falls into the neutral state and can be prevented from falling into the drive state.

Incidentally, the comparison of the synchronous r.p.m. of the current gearshift stage with the value obtained by adding the predetermined magnitude is intended to avoid a shock which arises when the input shaft r.p.m. agrees with the synchronous r.p.m. When it is permitted owing to the switchover of the synchro mechanism to issue the next gearshift command (toward the lower speed stage), the synchronous r.p.m. rises again and therefore comes to exceed the desired value.

Also the contrivance of the present invention as defined in Claim 11 pertains to the case where the coast downshift control apparatus for a vehicular automatic transmission as defined in Claim 3 or 4, is applied to the automatic transmission having a synchro mechanism. Herein, when the synchronous r.p.m. of a first speed stage, which is calculated in accordance with (Output shaft r.p.m. of Automatic transmission)×(Gear ratio of First speed stage), has become less than the desired value in a gearshift output state toward the first speed stage, because of the delay of the switchover of the synchro mechanism as is ascribable to a rapid deceleration, the desired value is changed over to a desired value with which the decreasing rate of the input shaft r.p.m. of the automatic transmission can be made smaller.

More specifically, regarding the automatic transmission furnished with the synchro mechanism, when the rapid deceleration is done, the synchronous r.p.m. of the first speed stage might become less than the desired value in the gearshift output state toward the first speed stage, because of the delay of the switchover of the synchro mechanism. On this occasion, even when the desired value is left set "so as to generate the weak engine braking", certainly the clutch of the gearshift-output-stage side (the clutch of the first speed stage) can result in automatically veering to its complete engagement as a qualitative tendency. It is apprehended, however, that the veering speed of the clutch will rise to incur a gearshift shock at the time of the complete engagement. Therefore, when the synchronous r.p.m. of the first speed stage has become less than the desired value in the gearshift output state toward the first speed stage, the "desired value for generating the weak engine braking" is changed over to the "desired value for lowering the input shaft r.p.m. of the automatic transmission at a predetermined decreasing rate". Then, the gearshift shock can be prevented from arising in the vicinity of the end of the gearshift toward the first speed stage.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIGS. 3A and 3B are tables showing the engagement states of the frictional engagement devices of the automatic transmission and the switchover states of the synchro mechanisms thereof;

DETAILED DESCRIPTION OF THE PREFERRED EMBODIMENTS

Now, the embodiments of the present invention will be described in detail with reference to the drawings.

Figure 2:
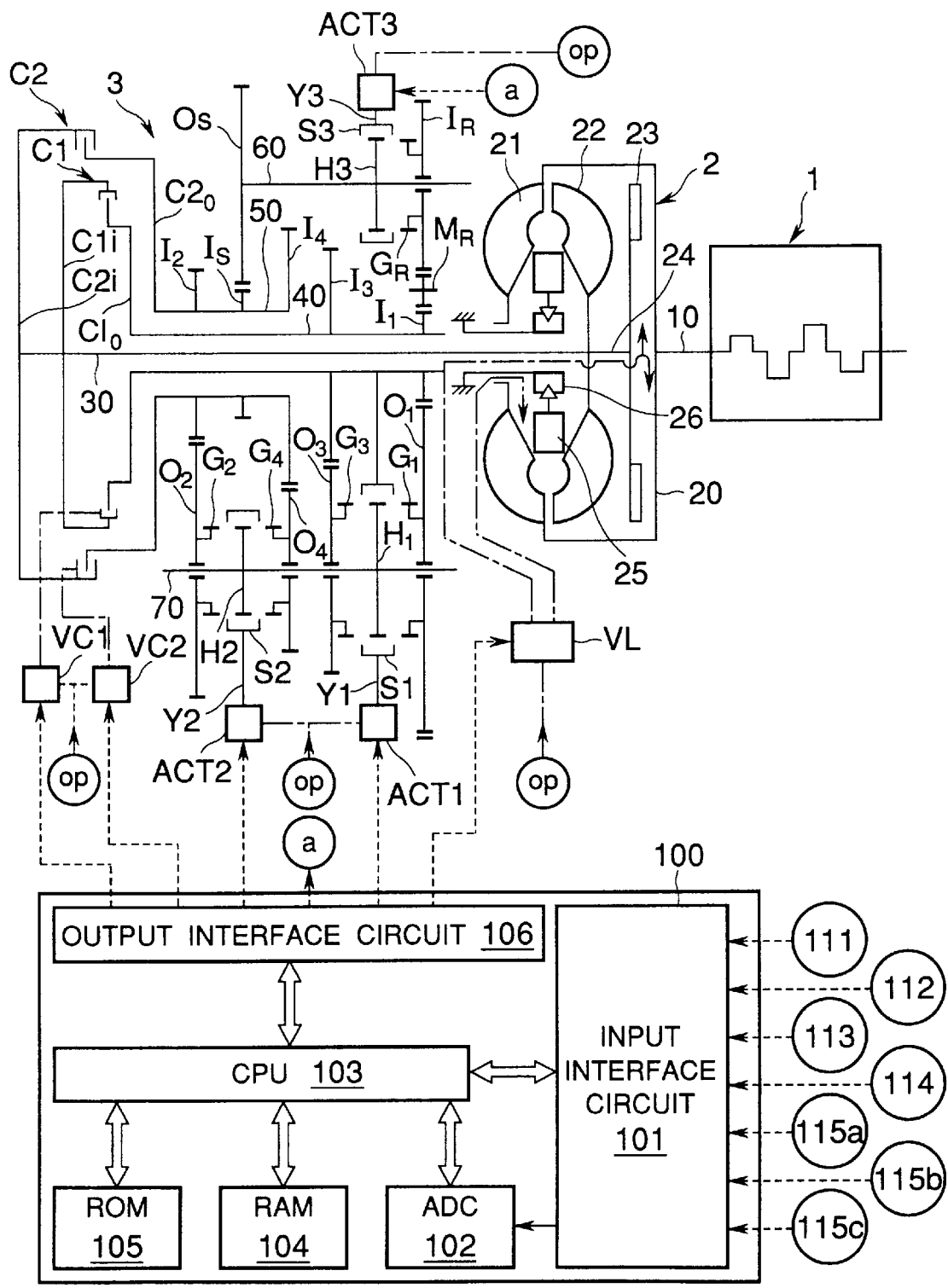
FIG. 2 is a block diagram schematically showing a vehicular automatic transmission of twin clutch type, to which the present invention is applied.

FIG. 2 is a diagram showing, in model-like fashion, the whole structure of a four-stage automatic transmission of twin clutch type furnished with a torque converter, to which the present invention is applied.

Referring to FIG. 2, numeral 1 designates the engine of a motor vehicle, numeral 2 the torque converter equipped with a lockup mechanism, and numeral 3 the twin clutch type automatic transmission.

The output shaft 10 of the engine 1 is connected to the front cover 20 of the torque converter 2. The front cover 20 is connected to the output shaft 24 of the torque converter 2 through a lockup clutch 23 only, or through a pump impeller 21 and a turbine 22 which are connected to each other through a fluid stream. The output shaft 24 of the torque converter 2 is connected to the input shaft (transmission input shaft) 30 of the twin clutch type automatic transmission 3 so as to be unitarily rotatable. Incidentally, numeral 25 indicates a stator, and numeral 26 a one-way clutch.

Connected to the input shaft 30 are the first-clutch input disc C1i of a first clutch C1 and the second-clutch input disc C2i of a second clutch C2.

The first-clutch output disc C1o of the first clutch C1 and the second-clutch output disc C2o of the second clutch C2 have a first-clutch output shaft 40 and a second-clutch output shaft 50 connected thereto, respectively. The output shafts 40 and 50 are coaxially arranged outside the input shaft 30.

A countershaft 60 and an output shaft (transmission output shaft) 70 are disposed in parallel with the input shaft 30 and output shafts 40 and 50.

A second-speed drive gear I2, a countershaft drive gear Is, and a fourth-speed drive gear I4 are fixedly connected to the second-clutch output shaft 50.

Also, a third-speed drive gear I3 is fixedly connected to the first-clutch output shaft 40 so as to adjoin the fourth-speed drive gear I4. Further, a first-speed drive gear I1 is fixedly connected to the side of the first-clutch output shaft 40 near to the torque converter 2.

Rotatably mounted on the output shaft 70 are a second-speed driven gear O2 which is always in mesh with the second-speed drive gear I2, a fourth-speed driven gear O4 which is always in mesh with the fourth-speed drive gear I4, a third-speed driven gear O3 which is always in mesh with the third-speed drive gear I3, and a first-speed driven gear O1 which is always in mesh with the first-speed drive gear A first synchro (synchro mechanism) D1 is configured of a first hub H1 which is fixedly connected to the output shaft 70, and a first sleeve S1 which is mounted on the outer peripheral edge of the first hub H1 so as to be slidable in the axial direction of the automatic transmission structure. The first sleeve S1 is moved through a first shift fork Y1 by a first-sleeve actuator ACT1 so as to come into engagement with a first-speed clutch gear G1 which is fixedly coupled to the first-speed driven gear O1, or with a third-speed clutch gear G3 which is fixedly coupled to the third-speed driven gear O3. Thus, the first-speed driven gear O1 and the third-speed driven gear O3 are selectively connected to the output shaft 70.

Likewise, a second synchro (synchro mechanism) D2 is configured of a second hub H2 which is fixedly connected to the output shaft 70, and a second sleeve S2 which is mounted on the outer peripheral edge of the second hub H2 so as to be axially slidable. The second sleeve S2 is moved through a second shift fork Y2 by a second-sleeve actuator ACT2 so as to come into engagement with a fourth-speed clutch gear G4 which is fixedly coupled to the fourth-speed driven gear O4, or with a second-speed clutch gear G2 which is fixedly coupled to the second-speed driven gear O2. Thus, the fourth-speed driven gear O4 and the second-speed driven gear O2 are selectively connected to the output shaft 70.

Disposed on the countershaft 60 are a countershaft driven gear Os which is always in mesh with the countershaft drive gear Is, and a reverse drive gear IR which is always in mesh with the first-speed drive gear I1 through an idler gear MR. The countershaft driven gear Os is fixedly connected to the countershaft 60, and is always rotated unitarily with the countershaft 60. In contrast, the reverse drive gear IR is rotatably mounted around the countershaft 60, and it is selectively connected to the countershaft 60 by a third synchro (synchro mechanism) D3 which is disposed midway between both the gears Os and IR.

The third synchro D3 is configured of a third hub H3 which is fixedly connected to the countershaft 60, and a third sleeve S3 which is mounted on the outer peripheral edge of the third hub H3 so as to be axially slidable. The third sleeve S3 is moved through a third shift fork Y3 by a third-sleeve actuator ACT3 so as to come into engagement with a reverse clutch gear GR which is fixedly coupled to the reverse drive gear IR. Thus, the reverse drive gear IR is selectively rotated unitarily with the countershaft 60.

FIGS. 3A and 3B illustrate the states of the engagements of the first clutch C1, second clutch C2, first sleeve S1, second sleeve S2 and third sleeve S3 at the respective speed stages.

Mark ○ indicates the engagement for transmitting power at the pertinent gearshift stage. Marks Δ and ∇ indicate the engagements which are respectively added for the preliminary selections for a downshift and for an upshift. The engagement added for the preliminary selection does not contribute to the transmission of the power at the pertinent gearshift stage.

Concretely, at the first speed stage, the first clutch C1 is held in engagement, the first-clutch output shaft 40 coupled to the first-clutch output disc C1o is rotated along with the first-speed drive gear I1 as well as the third speed drive gear I3, and the first-speed driven gear o1 being always in mesh with the first-speed drive gear I1 is rotated. Besides, the first sleeve S1 is located on its side of the first-speed clutch gear G1. Thus, the output shaft 70 is rotated along with the first hub H1 as well as the second hub H2, and the power is transmitted.

At the second speed stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the second-speed driven gear O2 being always in mesh with the second-speed drive gear I2 is rotated. Besides, the second sleeve S2 is located on its side of the second-speed clutch gear G2. Thus, the output shaft 70 is rotated along with the first hub H1 as well as the second hub H2, and the power is transmitted.

At the third speed stage, the first clutch C1 is held in engagement, the first-clutch output shaft 40 coupled to the first-clutch output disc C1o is rotated along with the first-speed drive gear I1 as well as the third-speed drive gear I3, and the third-speed driven gear O3 being always in mesh with the third-speed drive gear I3 is rotated. Besides, the first sleeve S1 is located on its side of the third-speed clutch gear G3 as stated before. Thus, the output shaft 70 is rotated along with the first hub H1 as well as the second hub H2, and the power is transmitted.

At the fourth speed stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the fourth-speed driven gear O4 being always in mesh with the fourth-speed drive gear I4 is rotated. Besides, the second sleeve S2 is located on its side of the fourth-speed clutch gear G4. Thus, the output shaft 70 is rotated along with the first hub H1 as well as the second hub H2, and the power is transmitted.

At the reverse stage, the second clutch C2 is held in engagement, the second-clutch output shaft 50 coupled to the second-clutch output disc C2o is rotated along with the second-speed drive gear I2, fourth-speed drive gear I4 and countershaft drive gear Is, and the countershaft 60 is rotated through the countershaft driven gear Os being always in mesh with the countershaft drive gear Is. Further, the third sleeve S3 is located on its side of the reverse clutch gear GR, so that the reverse drive gear IR is rotated, resulting in the rotation of the first-speed driven gear O1 through the reserve idler gear MR. Besides, the first sleeve S1 is located on its side of the first-speed clutch gear G1. Thus, the output shaft 70 is rotated along with the first hub H1 as well as the second hub H2, and the power is transmitted.

Herein, the gearshift between the respective gearshift stages is executed in such a way that the sleeve necessary for completing the transmission path of the gearshift stage to be established after the gearshift is moved till its engagement, that while one clutch used before the gearshift is being released, the other clutch to be used after the gearshift is gradually engaged, and that the sleeve completing the transmission path of the gearshift stage established before the gearshift is moved till its release.

By way of example, the gearshift from the second speed stage to the third speed stage is so executed that the first sleeve S1 is moved so as to be engaged with the third-speed clutch gear G3, that while the second clutch C2 is being released, the first clutch C1 is brought into engagement, and that the second sleeve S2 is moved so as to be disengaged from the second-speed clutch gear G2.

By the way, in this embodiment, as indicated in FIG. 3B, the next gearshift stage is anticipated from the drive environment (for example, vehicle speed) of the motor vehicle at the current time, and the synchro mechanism corresponding to the anticipated gearshift stage is brought into engagement beforehand. Thus, the changeover control of the clutches can be started as soon as the gearshift has been judged (as will be described later).

The controls of engaging and releasing the first clutch C1 and the second clutch C2 (the clutch-to-clutch changeover control) are performed in such a way that a first-clutch clutch plate (not shown) and a second-clutch clutch plate (not shown) connected to the first-clutch input disc C1i and second-clutch input disc C2i are respectively brought into frictional engagements with another first-clutch clutch plate (not shown) and another second-clutch clutch plate (not shown) connected to the first-clutch output disc C1o and second-clutch output disc C2o, by a first-clutch piston (not shown) and a second-clutch piston (not shown) which are hydraulically driven.

The pistons are driven in such a way that the working oil of an oil-pressure supply source OP shown in FIG. 2 is fed into and drained out of corresponding piston oil chambers. More specifically, the working oil is fed and drained by finely controlling a first-clutch supply-oil-pressure control valve VC1 and a second-clutch supply-oil-pressure control valve VC2 by means of an electronic control unit (hereinbelow, abbreviated to "ECU") 100.

As stated before, the first sleeve S1, second sleeve S2 and third sleeve S3 are respectively moved by the first-sleeve actuator ACT1, second-sleeve actuator ACT2 and third-sleeve actuator ACT3.

Although the structure of each of the sleeve actuators ACT1~ACT3 shall be omitted from detailed description, a piston to which the corresponding shift fork is connected is moved in a desired direction by feeding and draining the working oil of the oil-pressure supply source OP into and out of piston oil chambers which are formed on both the sides of the piston. For such an operation, a valve for controlling the feed of the working oil into the corresponding piston oil chamber, and a valve for controlling the drain thereof out of the same are provided, and the opening and closure of these valves are controlled by the ECU 100.

In the present invention, it is necessary to check if the sleeves S1~S3 have moved as predetermined. Therefore, the first-sleeve actuator ACT1, second-sleeve actuator ACT2 and third-sleeve actuator ACT3 include first, second and third sleeve position sensors 115a, 115b and 115c which detect the positions of the corresponding sleeves from the movements of the pistons, respectively. The signals of these sensors are sent to the input interface circuit 101 of the ECU 100.

The ECU 100 is constructed of a digital computer including the input interface circuit 101, an ADC (analog-to-digital converter) 102, a CPU (microprocessor) 103, a RAM (random access memory) 104, a ROM (read-only memory) 105 and an output interface circuit 106 which are interconnected.

The CPU 103 is supplied through the input interface circuit 101 or further through the ADC 102 with the output signals of various sensors such as a gear stage sensor 111 for detecting a gear stage position, a vehicle speed sensor 112 for detecting the vehicle speed (r.p.m. of the output shaft 70 of the transmission 3), a throttle opening sensor 113 for outputting the degree of opening of a throttle valve, an input-shaft r.p.m. sensor 114 for detecting the r.p.m. of the input shaft 30, and the sleeve position sensors 115a, 115b and 115c which are disposed in the respective sleeve actuators for detecting the sleeve positions as stated before.

In order to perform the control of the present invention as will be explained below, the CPU 103 generates signals on the basis of the output values of the various sensors and data stored in the ROM 105 beforehand. The signals include ones for controlling the sleeve actuators ACT1~ACT3 which move the respectively corresponding sleeves S1~S3, ones for controlling the first-clutch supply-oil-pressure control valve VC1 and second-clutch supply-oil-pressure control valve VC2 which control the respectively corresponding clutches C1 and C2 of the twin-clutch type automatic transmission 3, and one for controlling a lockup oil-pressure control valve VL which controls the lockup clutch 23. The generated signals are delivered to the respectively corresponding constituents through the output interface circuit 106.

Now, the contents of the control will be detailed.

Figure 1:
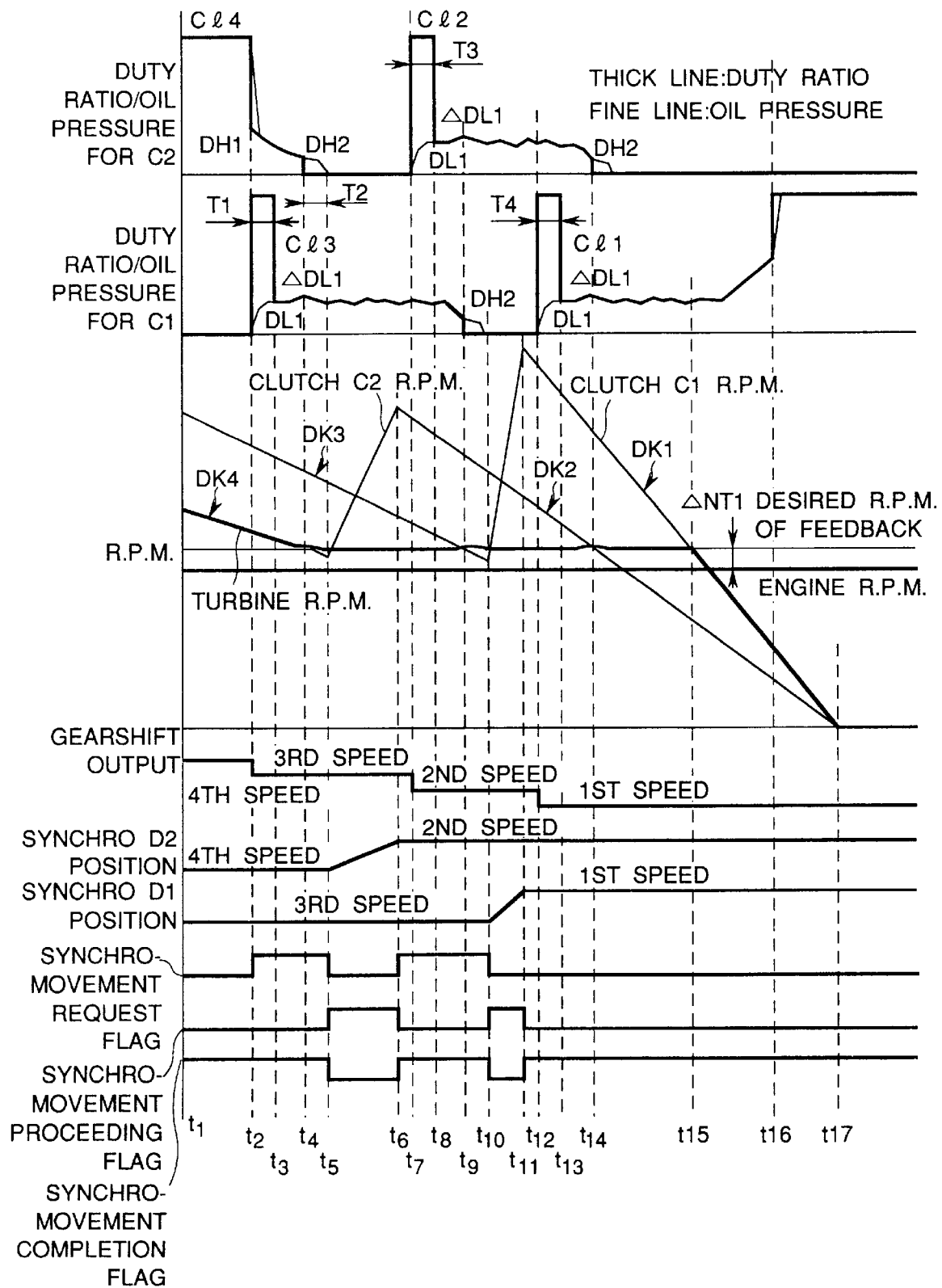
FIG. 1 is a time chart showing control characteristics in the case where the present invention is applied to a coast downshift of twin clutch type.

FIG. 1 is a time chart showing the control of a coast downshift according to the present invention.

The time chart illustrates the correlations among a duty ratio/oil pressure for the second clutch C2 which serves for both the fourth speed stage and the second speed stage, a duty ratio/oil pressure for the first clutch C1 which serves for the third speed stage and the first speed stage, turbine r.p.m. (=r.p.m. of the transmission input shaft 30) NT, the switchover states of the first synchro D1 and second synchro D2, a gearshift output stage, engine r.p.m. NE, the synchronous r.p.m. values DK1, DK2, DK3 and DK4 of the respective gearshift stages, and desired (target) turbine r.p.m. NTt. In order to facilitate understanding, the engine r.p.m. NE is assumed constant and is depicted as such here.

By the way, in each column of FIG. 1 depicting the duty ratio/oil pressure, a thick line indicates the duty ratio, while a fine line indicates the oil pressure. Herein, a line pressure of 100% is fed to the corresponding clutch C1 or C2 for the duty ratio of 100%, whereas the oil pressure of the corresponding clutch C1 or C2 is completely drained for the duty ratio of 0%.

Besides, as stated above, the first clutch C1 functions both as the clutch cl3 of the third speed stage and as the clutch cl1 of the first speed stage, while the second clutch C2 functions both as the clutch cl4 of the fourth speed stage and as the clutch cl2 of the second speed stage. In the ensuing description, the names of the clutches shall be occasionally changed one another for the sake of convenience.

In this embodiment, the clutch on the side of the lower speed stage (and the clutch on the side of the higher speed stage) is (are) controlled in order that the turbine r.p.m. NT may be maintained at (Engine r.p.m. NE+Predetermined magnitude $\Delta$NT1). That is, the turbine r.p.m. NT is adopted as a "predetermined parameter", and the value (NE+$\Delta$NT1) is set as the desired value (target value) thereof.

A part indicated by a time t1 at the left end of FIG. 1 illustrates that state before the gearshift operation in which the fourth-speed-stage clutch cl4 is fully or completely engaged, and in which the third-speed-stage clutch cl3 is fully released (the state in which the fourth speed stage is established).

When the turbine r.p.m. NT has arrived at or less than the downshift point of the third speed stage in a coasting state (the state in which the throttle valve is fully closed or nearly fully closed) in the above state of the fourth speed stage, it is decided that a gearshift judgement for executing the downshift has been made. Then, at a time t2, the duty ratio of the fourth-speed-stage clutch cl4 is abruptly brought down so as to release this clutch cl4 (here, however, the clutch cl4 is not fully released yet).

At the same time, the duty ratio of 100% is outputted for a term T1 as the oil pressure of the third-speed-stage clutch C13 in order to engage this clutch C13 (as the operation of so-called "first quick fill"). The duty ratio is lowered down to a level DL1 at a time t3, and the third-speed-stage clutch C13 is held on standby in this state. Thereafter, the duty ratio is raised every $\Delta$DL1.

The duty ratio DL1 is the very limit value with which the third-speed-stage clutch Cl3 has a transmission torque capacity.

In the prior art, the engagement of the third-speed-stage clutch cl3 is started simultaneously with the release of the fourth-speed-stage clutch cl4, so that the turbine r.p.m. NT begins to rise at a certain time. In contrast, according to this embodiment, for the purpose of maintaining the motor vehicle in a weak engine-braking state here, the duty ratio of the third-speed-stage clutch (gearshift-output-stage side clutch) cl3 is controlled in order that the turbine r.p.m. NT may be maintained at the desired r.p.m. (desired value) NTt which is set higher than the engine r.p.m. NE by the predetermined magnitude $\Delta$NT1. Concretely, at the time t4 at which the turbine r.p.m. NT (equal to the synchronous r.p.m. DK4 of the fourth speed stage at this point of time) has arrived at the desired r.p.m. NTt (Engine r.p.m. NE+Predetermined magnitude $\Delta$NT1), the duty ratio of the fourth-speed-stage clutch cl4 is brought down to 0% (corresponding to the fully drained state of the oil pressure), and that of the third-speed-stage clutch cl3 is feedback-controlled in order that the turbine r.p.m. NT may keep the desired r.p.m. NTt. Accordingly, the turbine r.p.m. NT is maintained at the desired r.p.m. NTt, and it does not rise.

On the other hand, when it is detected at a time t5 that the time period of a drain timer T2 started counting at the time t4 has lapsed, a command for switching over the second synchro D2 from the fourth-speed-stage position to the second-speed-stage position is issued.

The reason why the switchover command for the second synchro D2 is issued upon the time-out of the drain timer T2 here, is that, when the fourth-speed-stage clutch Cl4 has a transmission torque capacity even if slightly, the switchover of the second synchro D2 might be hindered, so it must be avoided. The movement of the synchro for the switchover is initiated and terminated as early as possible without hindrance.

When it is confirmed at a time t6 that the switchover of the second synchro D2 has been completed, a gearshift output of 3→2 is delivered at a time t7. Then, the duty ratio of the second-speed-stage clutch cl2 is kept set at 100% for a predetermined time period T3 (the "first quick fill" operation is performed) in order to engage again the second-speed-stage clutch cl2 (the second clutch C2) which serves as the lower-speed-stage side clutch anew. Subsequently, the duty ratio of the clutch cl2 is once lowered down to a level DL1 at a time t8, and this clutch cl2 is held on standby. Thereafter, the duty ratio of the second clutch C2 is raised every $\Delta$DL1. This state is continued until the duty ratio of the first clutch C1 lowers (namely, the transmission torque capacity borne by the clutch C1 decreases) down to a level DH2 owing to the fact that the turbine r.p.m. NT rises to some extent because the second clutch C2 has begun to have a transmission torque capacity. At the corresponding point of time t9, the duty ratio of the third-speed-stage clutch cl3 (the first clutch C1) is set at 0% (the oil pressure is fully drained).

As in the foregoing, after the time t9, the second-speed-stage clutch cl2 (the second clutch C2) serving as the lower-speed-stage side clutch anew has come to have the transmission torque capacity, so that the control for maintaining the turbine r.p.m. NT at the desired r.p.m. NTt is altered on this occasion so as to be performed by the feedback control of the second-speed-stage clutch cl2.

When it is detected (by a drain timer) at a time t10 that the oil pressure of the third-speed-stage clutch cl3 (the first clutch C1) has been fully drained, the operation of switching over the first synchro D1 from the third-speed-stage position to the first-speed-stage position is initiated.

When it is confirmed at a time t11 that the switchover of the first synchroD1 has been completed, a gearshift output of 2→1 is delivered at a time t12. Then, the duty ratio of the first-speed-stage clutch cl1 (the first clutch C1) which serves as the lower-speed-stage side clutch anew is kept set at 100% for a predetermined time period T4 (the "first quick fill" operation is performed) again. Subsequently, the duty ratio of the clutch cl1 is lowered down to the level DL1 (a time t13). Thereafter, the duty ratio is increased every ΔDL1. The feedback control of the second-speed-stage clutch cl2 is continued until the first clutch C1 begins to have the transmission torque capacity at a time t14. The oil pressure of the second-speed-stage clutch cl2 is fully drained at the time t14.

After the time t14, the control for maintaining the turbine r.p.m. NT at the desired r.p.m. NTt is performed by feedback-controlling the duty ratio of the first-speed-stage clutch cl1 (the first clutch C1) being the lower-speed-stage side clutch.

Incidentally, after the time t15 at which the turbine r.p.m. NT has arrived at the desired r.p.m. NTt, the oil pressure of the first-speed-stage clutch cl1 may well be feedback-controlled so as to lower the turbine r.p.m. NT at a predetermined lowering rate (as will be described later).

At a time t16, it is decided that the first-speed-stage clutch cl1 has been fully engaged (by confirming the full engagement on the basis of the vehicle speed, or on the basis of a situation where the predetermined conditions of the coast control have not been met or where conditions for terminating the coast-down have been met), and the duty ratio of the first-speed-stage clutch cl1 is maintained at 100%.

In due course, the motor vehicle stops at a time t17.

Next, control flows in this embodiment will be described in detail.

Figure 4:
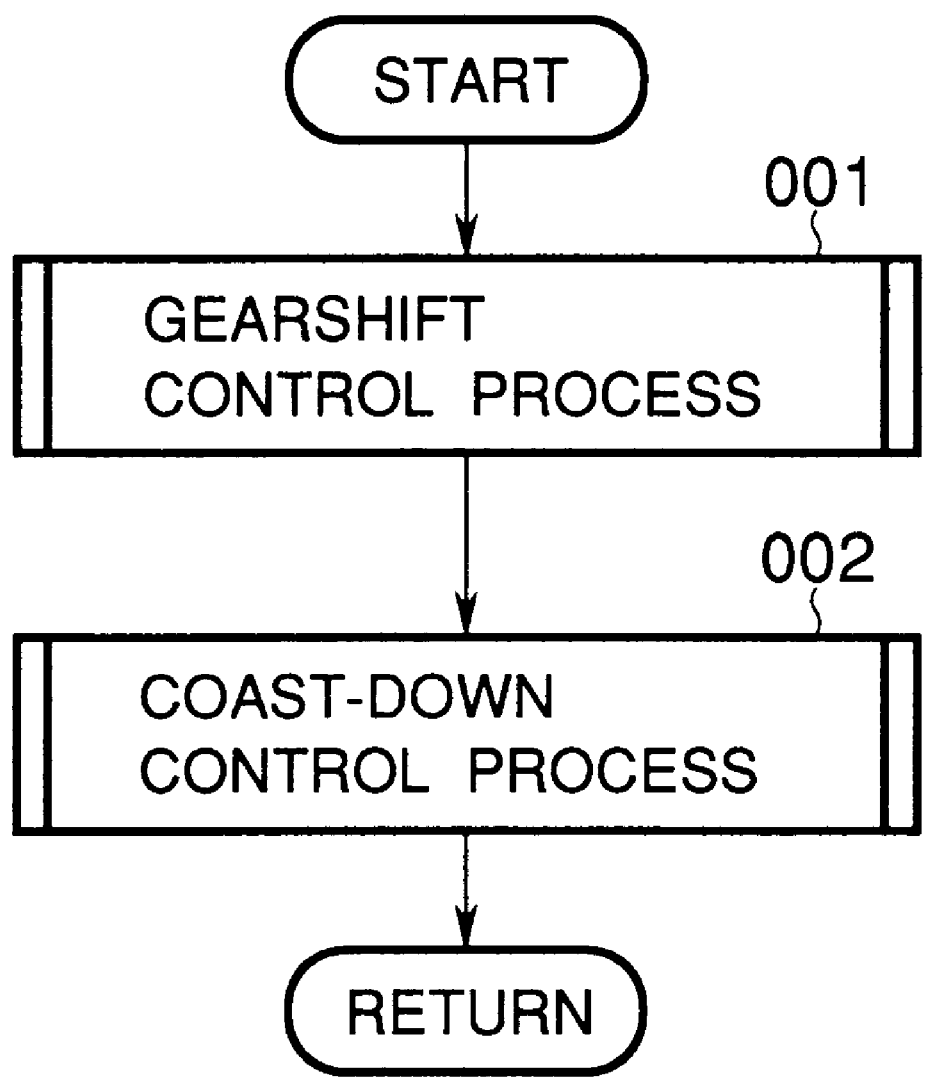
FIG. 4 is a flow chart showing a control which is processed by a computer in order to execute a coast downshift in the automatic transmission.
Figure 5:
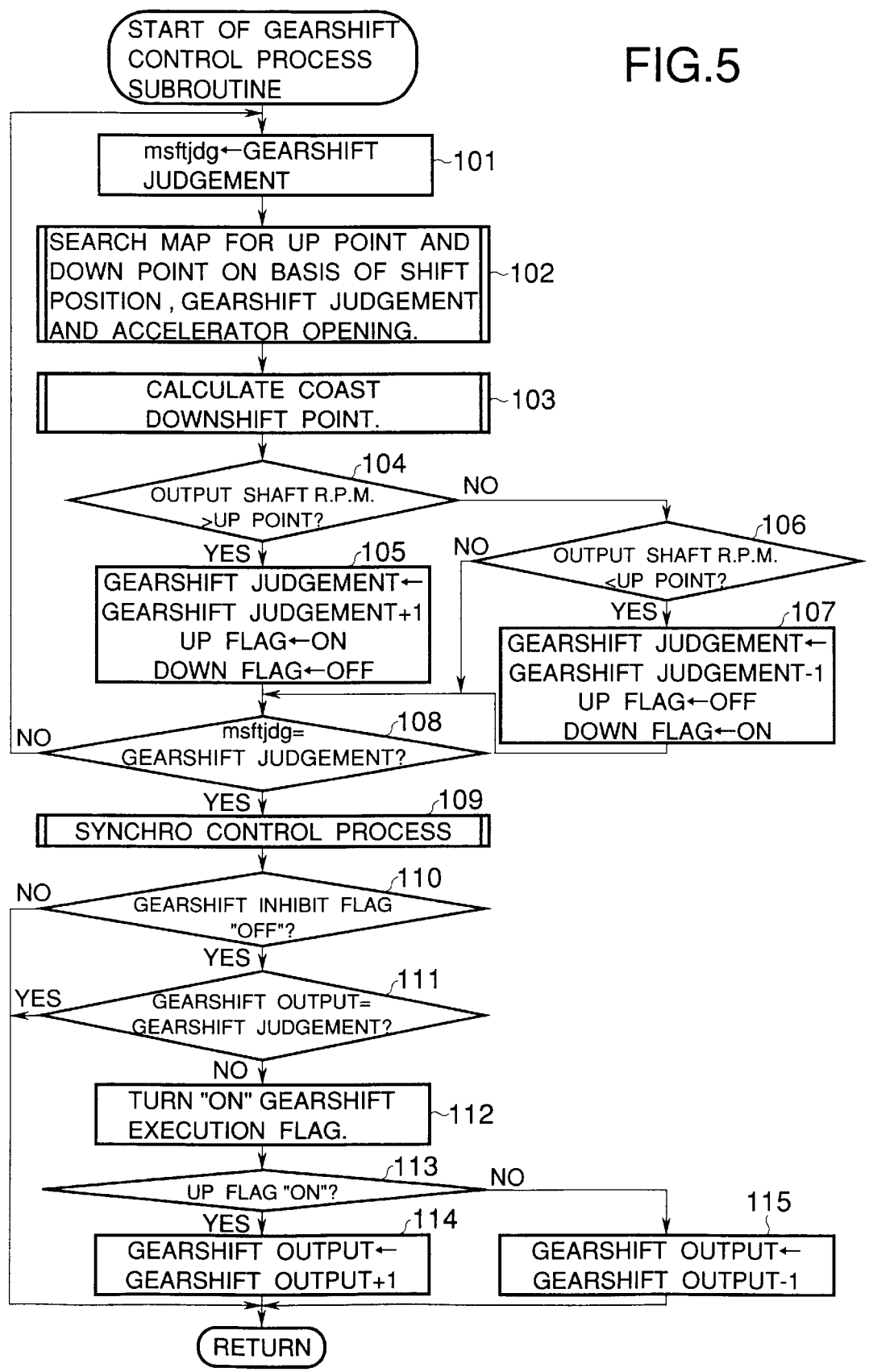
FIG. 5 is a flow chart showing a gearshift control process subroutine in FIG. 4.
Figure 6:
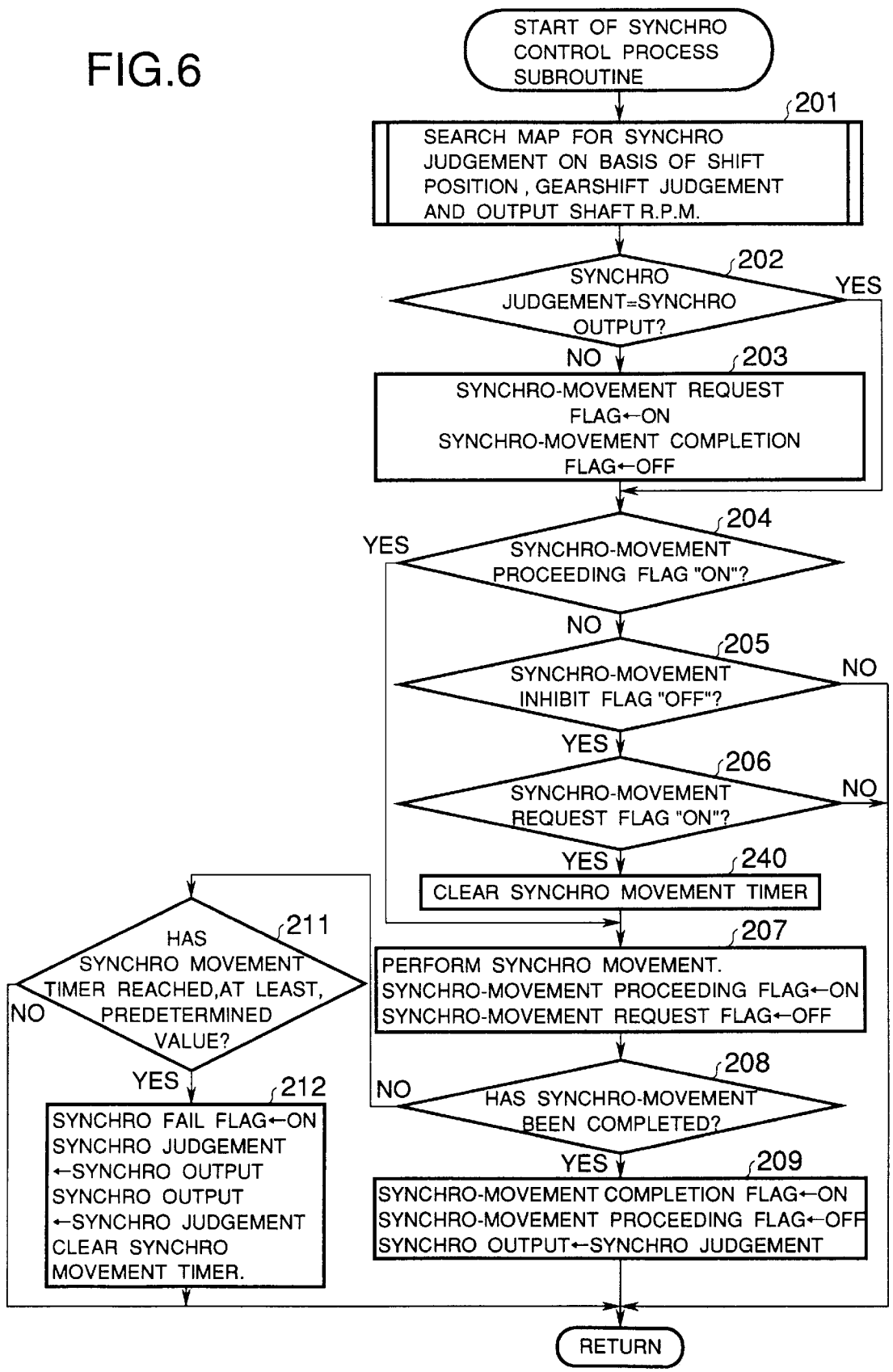
FIG. 6 is a flow chart showing a synchro control process subroutine in FIG. 5.

FIG. 4 is a flow chart showing the whole gearshift control, FIG. 5 is a flow chart showing a gearshift control subroutine, and FIG. 6 is a flow chart showing a synchro control subroutine. Since the principal substantial contents of the control to be performed in accordance with the flow charts have already been described by reference to FIG. 1, the steps of the processes of the control shall be schematically explained along the flow charts here.

As illustrated in FIG. 4, the series of control flows are chiefly composed of a gearshift control process routine (step 001) and a coast-down control process routine (step 002). Of these routines, the gearshift control process routine (step 001) will be first explained in detail.

Referring to FIG. 5, at a step 101, the current gearshift judgement stage is stored in the area "msftjdg" of the RAM (104 shown in FIG. 2). At a step 102, a map is searched for an upshift point (up gearshift point) and a downshift point (down gearshift point) on the basis of a shift position, the gearshift judgement stage and an accelerator opening degree. Here, the expression "gearshift judgement stage" indicates a gearshift stage which is a result obtained by judging the speed stage where the motor vehicle ought to lie, from the current drive conditions or drive state thereof. The expression "shift position" signifies the position of the shift lever, such as a drive range, a second-speed range or a reverse range. The expressions "upshift point" and "downshift point" signify those gear shifting threshold values of the r.p.m. of the output shaft (70 in FIG. 2) of the automatic transmission which are respectively determined on an up side and a down side at each point of time by the map beforehand.

The coast downshift point is calculated at a step 103.

A step 104 serves to judge whether or not the output shaft r.p.m. is higher than the upshift point. Subject to the judgement that the output shaft r.p.m. is higher, an upshift is decided at a step 105 to increase the gearshift judgement stage to the amount of 1 (one), and to turn ON an up flag and OFF a down flag. In contrast, when a relation (Output shaft r.p.m.≦Upshift point) holds at the step 104, a downshift is similarly decided at steps 106 and 107.

Whether or not the gearshift judgement stage has been altered, is judged at a step 108. In a case where the gearshift judgement stage has been altered, the control flow returns to the step 101, and the processing stated above is executed on the basis of a new gearshift judgement stage.

On the other hand, in a case where the gearshift judgement stage has not been altered at the step 108, the control flow advances to a step 109, at which a synchro control process is executed (as will be described in conjunction with FIG. 6).

Steps 110~115 serve to control the reflection of the gearshift judgement stage into the gearshift output when a gearshift inhibit flag is OFF (step 110). Owing to the control flow, the steps of procedure are successively actualized for generating the gearshift output of the fourth speed stage→the third speed stage at the time t2, that of the third speed stage→the second speed stage at the time t7 and that of the second speed stage→the first speed stage at the time t12, respectively.

Next, FIG. 6 illustrates the subroutine of the synchro control process which is executed at the step 109 (FIG. 5).

At a step 201, a map is searched for a synchro position judgement (a position where the synchro mechanism ought to finally lie) on the basis of the shift position, the gearshift judgement stage and the output shaft r.p.m. A step 202 serves to decide whether or not the resulting synchro position judgement differs from the actual synchro position output. In a case where the judgement differs, a step 203 functions to turn ON a synchro-movement request flag and to turn OFF a synchro-movement completion flag.

FIG. 3B exemplifies the synchro position judgement map in the D (drive) range. A case, for example, where the gearshift judgement stage is the first speed stage, is divided into an occasion where the output shaft r.p.m. at that time is less than a value No. 1 and an occasion where it is equal to or greater than the value No. 1. When the output shaft r.p.m. is less than the value No. 1, the first-speed position (the first synchro D1) and also the neutral position (the second synchro D2) are prepared beforehand. When the output shaft r.p.m. is equal to or greater than the value No., 1, the first-speed side (first synchro D1) and also the second-speed position (the second synchro D2) are selected and connected as the synchro positions beforehand. The reason therefor is that, on this occasion, the gearshift to subsequently occur may highly possibly be a gearshift to the second speed stage. Likewise, in a case where the gearshift judgement stage is the second speed stage, the first-speed position and the second-speed position are selected as the "synchro position judgement" when the output shaft r.p.m. at that time is less than a value No. 2, and the second-speed position and the third-speed position are determined as the "synchro position judgement" when the output shaft r.p.m. is equal to or greater than the value No. 2.

Referring back to FIG. 6, steps 204~212 correspond to processing in which the operation of switching over the position of the second synchro D2 from the fourth-speed position to the second-speed position is started at the time t5 and is ended at the time t6 in FIG. 1, the operation of switching over the position of the first synchro D1 from the third-speed position to the first-speed position is started at the time t10 and is ended at the time t11, and these operations are confirmed.

More specifically, in a case where a synchro-movement proceeding flag is ON (step 204), or in a case where a synchro-movement inhibit flag is OFF (step 205) and where the synchro-movement request flag is ON (step 206), the synchro movement timer is cleared at a step 240, and the synchro movement is performed (step 207). At a step 208, the completion of the synchro movement is decided. Subject to the completion of the movement, a step 209 functions to turn ON the synchro-movement completion flag and OFF the synchro-movement proceeding flag and to substitute the synchro position judgement into the synchro position output.

On the other hand, subject to the decision of the step 208 that the synchro movement is not completed yet, whether or not the synchro movement timer has reached, at least, the predetermined value T5 is checked (step 211). Subject to "NO" at the step 211, the control flow is directly returned. Subject to "YES", it is decided that the defective switchover of the synchro has occurred due to any cause, and the control flow advances to a step 212, which executes the processing of "turning ON the synchro fail flag, substituting the synchro output stage into the synchro judgement stage and also the synchro judgement stage into the synchro output stage, and clearing the synchro movement timer". Then, the control flow is returned. As a result, the synchro mechanism is returned to the original position, and the control can be quitted from a situation where the completion of the synchro movement is not judged forever.

Figure 7:
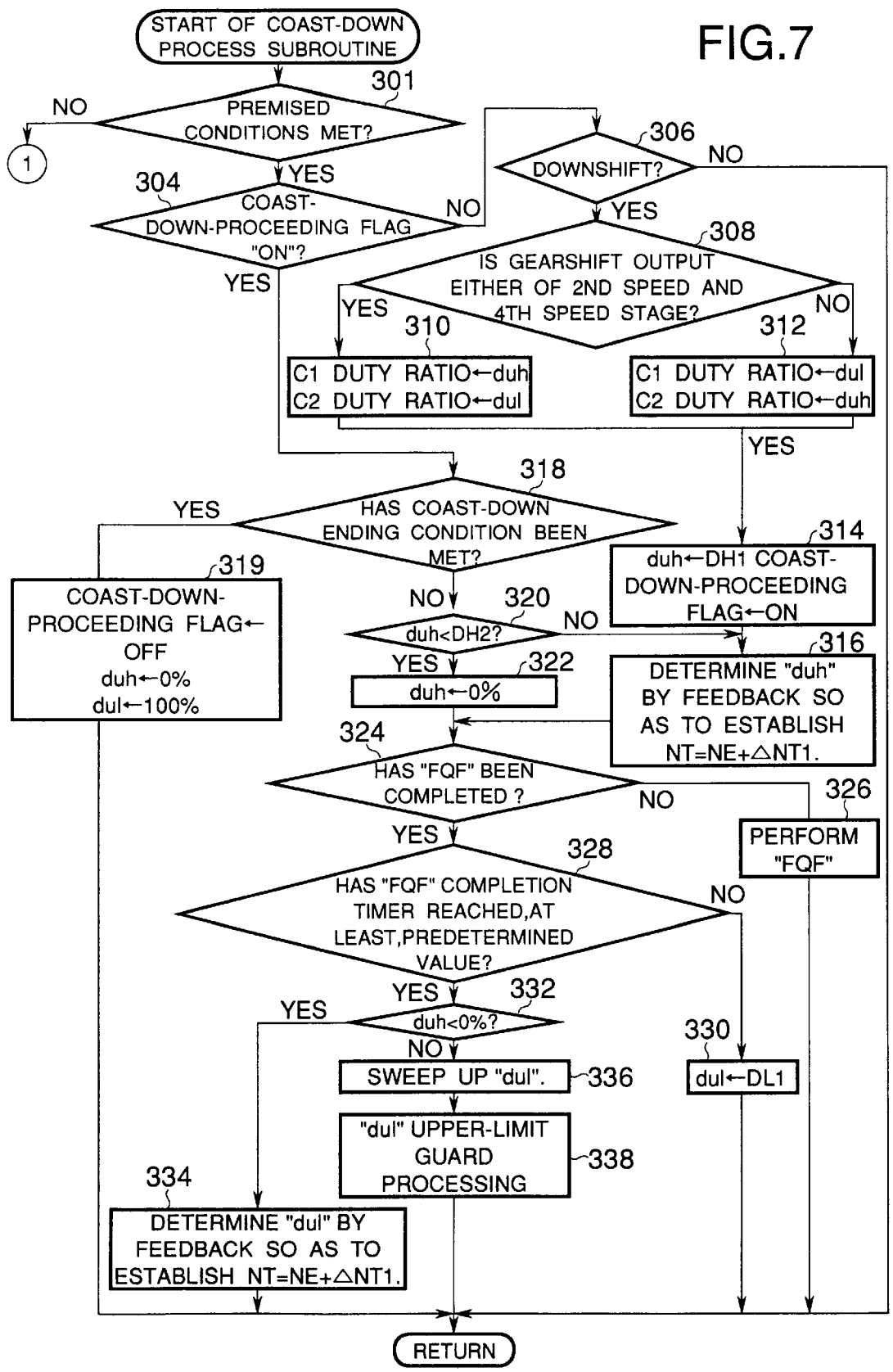
FIG. 7 is a flow chart showing a coast-down control process subroutine in FIG. 4.

Next, a flow chart concerning the subroutine of the coast-down process of the step 002 (FIG. 4) will be described with reference to FIG. 7.

A step 301 functions to judge whether or not the premised conditions (predetermined conditions) of the coast downshift control are satisfied. In this embodiment, the following four conditions are set as the premised conditions:

1) The D range is selected.

2) An idle contact is "ON".

3) The degree of opening of the accelerator is equal to or less than a predetermined value (near to zero).

4) The output shaft r.p.m. (vehicle speed) is equal to or greater than a predetermined value (near to zero).

Processing ①  in the case where the premised conditions are not met, will be explained later.

Upon the judgement that the premised conditions have been met, the control flow advances to a step 304, which decides whether or not a flag indicating the proceeding of coast-down (i.e., a flag indicating that the motor vehicle is coasting down) is "ON". When the coast-down-proceeding flag is "OFF", whether or not the gearshift is a downshift (whether or not a "down" flag is "ON") is decided at a step 306. In a case where the gearshift is not the downshift, the illustrated control routine is exited from. On the other hand, in a case where the gearshift is the downshift, a step 308 functions to judge whether or not the current gearshift output is either of the second speed stage and the fourth speed stage. If the gearshift output is either of the second speed stage and the fourth speed stage, the control flow advances to a step 310, at which the duty ratio "duh" (of the higher-speed-stage side) is defined as the duty ratio of the first clutch C1, while the duty ratio "dul" (of the lower-speed-stage side) is defined as the duty ratio of the second clutch C2. Besides, if the gearshift output is neither of the second speed stage and the fourth speed stage, the control flow advances to a step 312, at which the duty ratio "dul" is defined as the C1 duty ratio, while the duty ratio "duh" is defined as the C2 duty ratio.

Thereafter, the control flow advances to a step 314, which functions to substitute a value DH1 (refer to the time t2 in FIG. 1) into the duty ratio "duh" of the higher-speed-stage side and to turn "ON" the coast-down-proceeding flag.

Besides, at a step 316, the duty ratio "duh" is determined by feedback in order that the turbine r.p.m. NT may become (Engine r.p.m. NE+Predetermined magnitude ΔNT1). The reason why the turbine r.p.m. NT is controlled so as to become (NE+ΔNT1) on the basis of the duty ratio "duh" of the higher-speed-stage side here, is that the clutch of the lower-speed-stage side does not have a transmission torque capacity yet at this control stage. Incidentally, the control based on the higher-speed-stage side clutch on this occasion is not always indispensable (in the present invention).

The step 316 is followed by a step 324, which judges whether or not the "first quick fill", (of the lower-speed-stage side clutch) has been completed. Initially, it is judged that the "first quick fill" is not completed. Therefore, the control flow advances to a step 326 for performing the "first quick fill", and it is returned.

After the return, it is judged at the step 304 that the coast-down-proceeding flag is "ON". Therefore, the control flow advances to a step 318, which functions to judge whether or not conditions for ending the coast-down are satisfied. The conditions for ending the coast-down (predetermined conditions for release) are as follows:

1) The gearshift output stage is the first speed stage.

2) A state where the difference between the turbine r.p.m. NT and the synchronous r.p.m. of the first speed stage (Output shaft r.p.m.×Gear ratio of First speed stage) is not greater than a predetermined value, is detected continually for a predetermined time period.

3) The duty ratio of the lower-speed-stage side (the first speed stage) is not less than a predetermined value.

At this control stage, it is judged that the coast-down ending conditions are not met. Therefore, the control flow advances to a step 320, which functions to decide whether or not the duty ratio "duh" is less than a predetermined value DH2 (refer to the time t4 in FIG. 1). When the duty ratio "duh" is not less than the predetermined value DH2, the operation of determining the duty ratio "duh" by the feedback so as to establish the relation NT=NTt=NE+ΔNT1 as stated above is continued at the step 316.

In due course, when the clutch of the lower-speed-stage side (the gearshift-output-stage side) has come to have a transmission torque capacity (as the result of the feedback control at the step 316), it is judged at the step 320 that the duty ratio "duh" is less than the predetermined value DH2. Therefore, the control flow advances to a step 322, at which the duty ratio "duh" is set at 0% (the oil pressure is fully drained). After the step 322 has been passed, whether or not the "first quick fill" has been completed is checked again at the step 324. When the FQF has not been completed, the control flow advances to the step 326 again. In contrast, when the FQF has been completed, the control flow advances to a step 328 for judging whether or not a timer, which is activated after the completion of the FQF, has reached to a predetermined value. While the timer does not reach the predetermined value, the duty ratio "dul" is maintained at the predetermined value DL1 at a step 330. When the timer has timed up, the control flow advances to a step 332, at which whether or not the duty ratio "duh" is 0% is checked again. Subject to the judgement of the step 332 that the duty ratio "duh" of the higher-speed-stage side is not 0%, the state of the control at the current point of time is considered one before the time t4, t9 or t14 in FIG. 1.

Therefore, the duty ratio "dul" of the lower-speed-stage side is swept up (gradually increased) at a step 336, and the upper-limit guard processing of the duty ratio "dul" is executed at a step 338. In contrast, subject to the judgement of the step 332 that the duty ratio "duh" is 0%, since the control state at the current point of time is considered one after the oil pressure of the higher-speed-stage side is fully drained, namely, one after the time t4, t9 or t14, the control flow advances to a step 334, at which the duty ratio "dul" of the lower-speed-stage side is determined by feedback in order that the turbine r.p.m. NT may become the value (the desired value) which is obtained by adding the predetermined magnitude ΔNT1 to the engine r.p.m. NE.

When the conditions for ending the coast-down have been met at the step 318, the control flow advances to a step 319 for turning "OFF" the coast-down-proceeding flag and for setting the duty ratios "duh" and "dul" at 0% and 100%, respectively.

Owing to the control flow, as illustrated in FIG. 1, the turbine r.p.m. NT is maintained at the value which is higher than the engine r.p.m. NE by the magnitude ΔNT1, without fail whatever gearshift output is being delivered. Accordingly, engine braking of appropriate degree which is neither too high nor too low is always attained.

In particular, when the gearshift output stage has lowered one stage with respect to the preceding state, the control of keeping the desired value is continued as it is, by the clutch which was the lower-speed-stage side clutch before and which has become the higher-speed-stage side clutch thenceforth. Besides, when the clutch having become the lower-speed-stage side clutch anew has come to have a transmission torque capacity, the control based on the higher-speed-stage side clutch is switched over to the control based on the lower-speed-stage side clutch. Therefore, the control of keeping the desired value can be continuously performed to realize a very stable control.

By the way, when the synchronous r.p.m. of the first speed stage falls below the desired r.p.m. (NE+ΔNT1) of the feedback after the delivery of the gearshift output of the first speed stage, naturally the turbine r.p.m. NT lowers. Consequently, the duty ratio "dul" of the lower-speed-stage side can be automatically veered toward the complete engagement in order to raise the turbine r.p.m. NT to the desired r.p.m. (NE+ΔNT1). After the time t15 in FIG. 1, accordingly, the desired value is already unattainable even when the oil pressure to be fed to the clutch on the side of the first speed stage (gearshift output stage) is shifted toward the complete engagement side. Nevertheless, the feedback control based on the desired value may well be continued as it is.

Herein, however, in a case where the feedback control left intact is continued without any contrivance after the time t15, the duty ratio "dul" of the lower-speed-stage side might suddenly rise toward 100% to incur an engagement shock. Therefore, after the synchronous r.p.m. of the first speed stage has fallen below the desired r.p.m. (NE+ΔNT1), the desired value may well be changed with time. By way of example, it may well be set at such a value that the turbine r.p.m. NT lowers at a predetermined rate (d/dt(NT)= constant, namely, deceleration of the motor vehicle is constant).

Although, in the embodiment, the present invention is applied to the automatic transmission having the synchro mechanism, naturally it is also applicable to an automatic transmission having no synchro mechanism, in the light of its purport.

Besides, in the embodiment, the input shaft r.p.m. (turbine r.p.m.) of the automatic transmission is employed as the "predetermined parameter", and the value which is higher than the engine r.p.m. by the predetermined magnitude is prepared as the value of the input shaft r.p.m. It is to be understood, however, that the method for keeping the "weak engine braking" is not always restricted to the one stated above.

By way of example, even in the case where the input shaft r.p.m. of the automatic transmission is similarly employed as the "predetermined parameters, a value which is lower than the synchronous r.p.m. of the gearshift output stage (Output shaft r.p.m. of the automatic transmission×Gear ratio of the gearshift output stage) by a predetermined magnitude may well be prepared as the desired value of the input shaft r.p.m.

Figure 8:
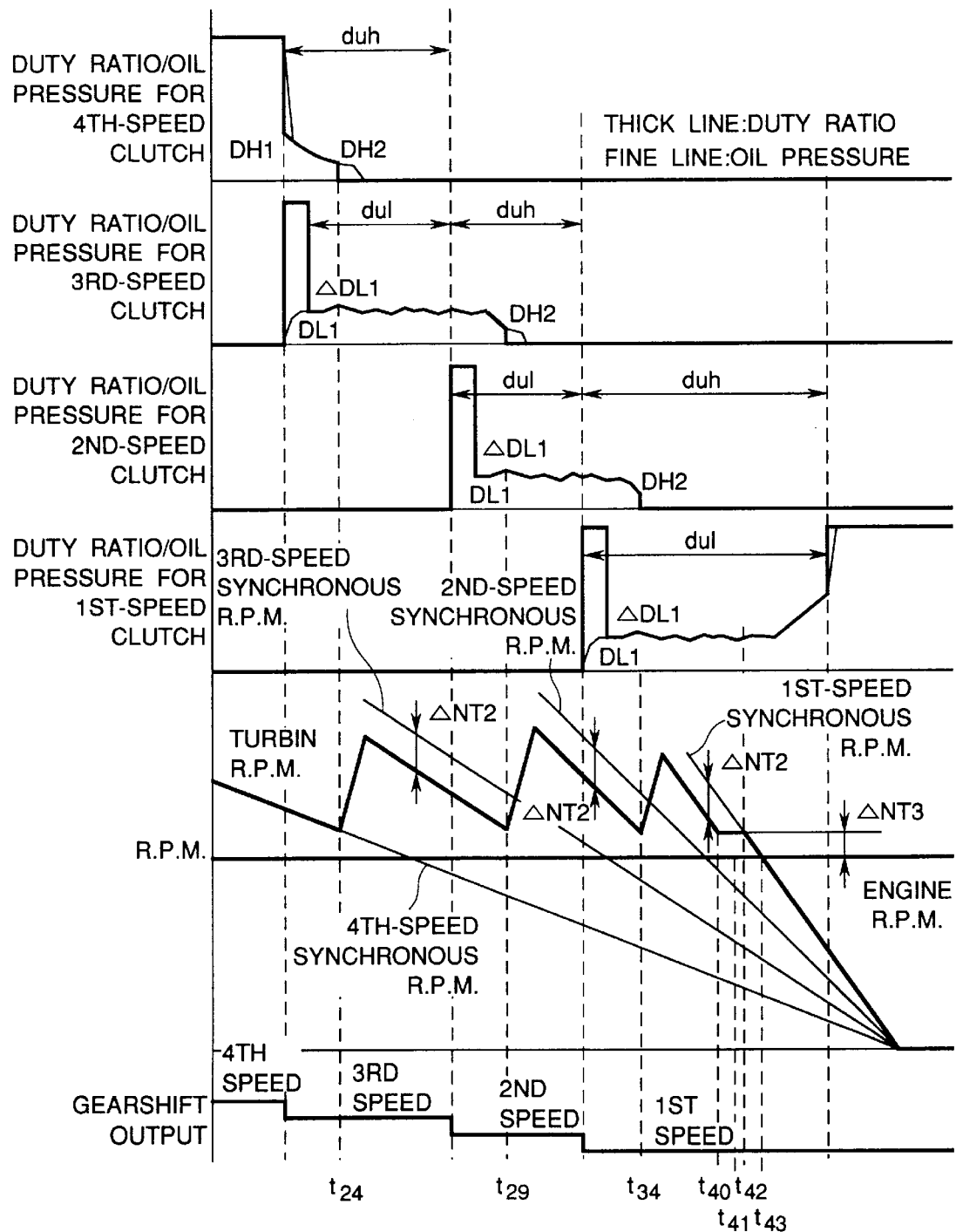
FIG. 8 is a time chart similar to FIG. 1, showing the second embodiment of the present invention.

FIG. 8 illustrates a time chart in the case where the present invention is applied to a hitherto-known 4-speed automatic transmission (having no synchro mechanism), and where (Synchronous r.p.m. of Gearshift output stage−Predetermined magnitude ΔNT2) as stated before is prepared as a desired value for keeping weak engine braking, while the duty ratio "dul" of the gearshift-output-stage side (lower-speed-stage side) is controlled in order that the turbine r.p.m. NT may be maintained at the desired value at each gearshift output stage.

Here, the changeover of the clutches for keeping the desired value is effected at a time (t24, t29 or t34 corresponding to the time t4, t9 or t14 in FIG. 1) at which, as in the foregoing embodiment, the duty ratio "dul" of the gearshift stage side has the very limit capacity (transmission torque capacity), while the duty ratio "duh" of the higher-speed-stage side is set at 0%.

The reasons why the value smaller than the synchronous r.p.m. by the magnitude ΔNT2 is kept, are that engine braking is prevented from enlarging excessively (the weak engine-braking state is kept), and that when the turbine r.p.m. NT is raised up to the synchronous r.p.m., a gearshift shock arises at the point of time at which the turbine r.p.m. NT has arrived at the synchronous r.p.m.

By the way, in the embodiment shown in FIG. 8, when the turbine r.p.m. NT has lowered down to a value, which is obtained by adding a predetermined magnitude ΔNT3 to the engine r.p.m. NE, at a time t40 amidst the control based on (Synchronous r.p.m. of First speed stage−ΔNT2), this value (NE+ΔNT3) is kept for a while (the desired value is changed over) until the turbine r.p.m. NT comes into agreement with the synchronous r.p.m. of the first speed stage (t40~t42). The reason therefor is as stated below. In a case where the feedback control is continued without changing the desired value (Synchronous r.p.m. of First speed stage−ΔNT2), the motor vehicle diverts from the "weakly engine-braked state" into the drive state thereof at the time t41 in FIG. 8. In contrast, according to the control of this embodiment, the time at which the weak engine-braking state is diverted into the drive state can be extended to a time t43. Incidentally, the predetermined magnitude ΔNT3 can be set substantially equal to the predetermined magnitude ΔNT1.

Excepting the above points and the fact that clutches (first-speed~fourth-speed clutches) for achieving the respective gearshift stages are separately disposed (because the automatic transmission is not of the twin clutch type), this embodiment is similar to the embodiment already described centering on FIG. 1.

Figure 9:
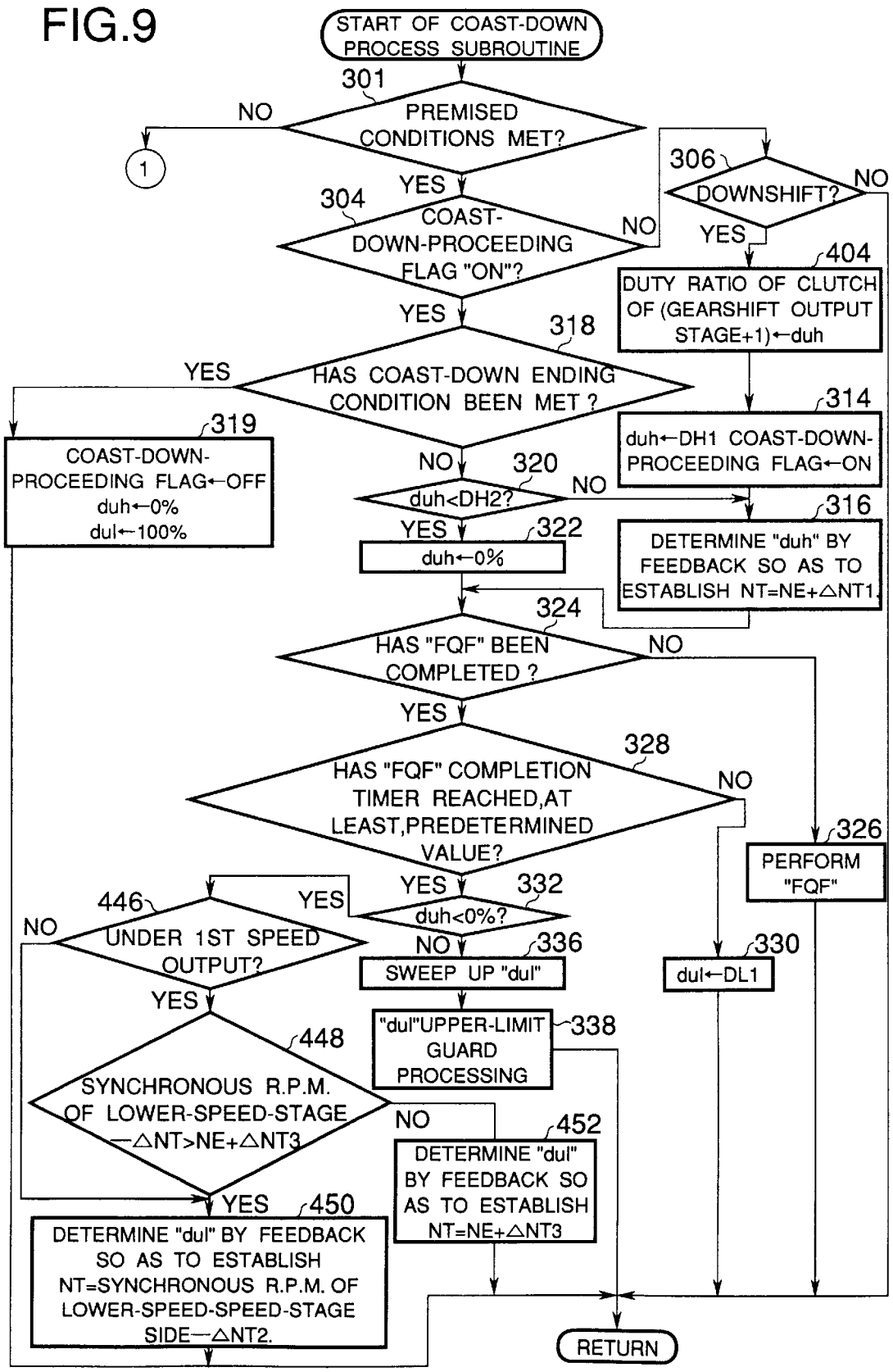
FIG. 9 is a flow chart showing a coast-down process subroutine for performing the second embodiment.

The time chart of FIG. 8 can be incarnated by executing a control routine as illustrated in FIG. 9.

In the control flow shown in FIG. 9, (since the automatic transmission is not the one having the synchro mechanism,)

the duty ratios "duh" and "dul" are respectively defined as those of the preceding-gearshift-stage clutch and the gearshift-output-stage clutch at a step 404, and steps (446~452) for executing the processing at the time t40 et seq. in FIG. 8 are added at and after the step 446. Since the others are basically the same as in the control flow of FIG. 7 already referred to, the same steps shall be merely indicated by the same reference numerals and shall not be iteratively explained.

Next, an embodiment illustrated in FIGS. 10 and 11 will be described.

In this embodiment, the r.p.m. ratio e (=Turbine r.p.m. NT/Engine r.p.m. NE) of the torque converter (2 in FIG. 2) is employed as the "predetermined parameter", and a predetermined value slightly larger than 1 (one), for example, a constant on the order of 1.2 is set as the desired value of the r.p.m. ratio e.

This contrivance has the same significance as employing the input shaft r.p.m. NT of the automatic transmission as the "predetermined parameter", and then preparing a value, which is obtained by multiplying the engine r.p.m. NE by a predetermined magnitude $\Delta NT4$, as the desired value of the input shaft r.p.m. NT.

More specifically, in the embodiment shown in FIG. 1, $NE+\Delta NT1$ (the difference of the input shaft r.p.m. NT from the engine r.p.m. NE is constant) is prepared as the desired value NTt of the input shaft r.p.m. NT, whereas in this embodiment, the desired value of $NE \times \Delta NT4$ (the ratio of the input shaft r.p.m. NT to the engine r.p.m. NE is constant) is prepared.

Figure 10:
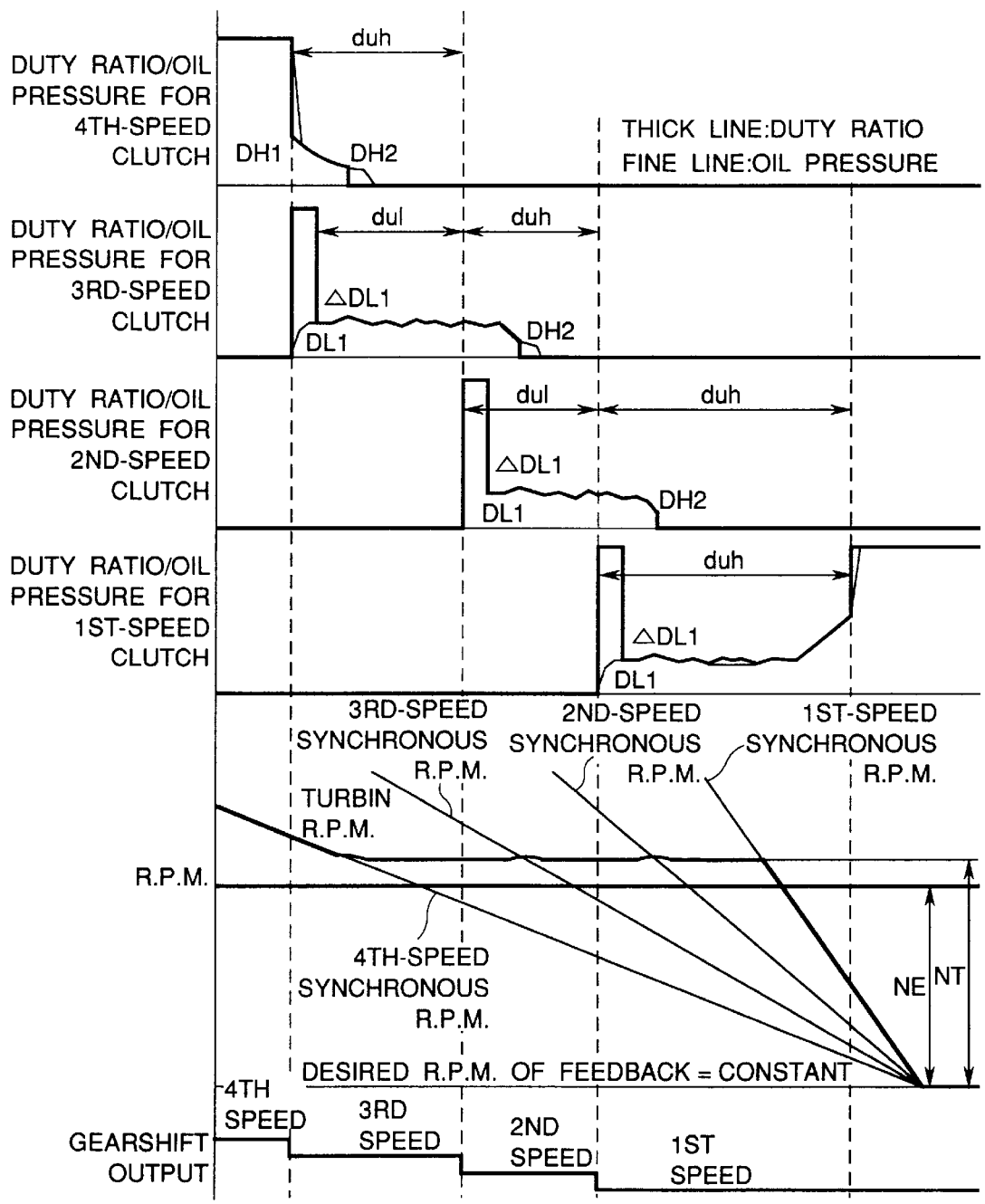
FIG. 10 is a time chart correspondent to FIG. 1, showing the third embodiment of the present invention.
Figure 11:
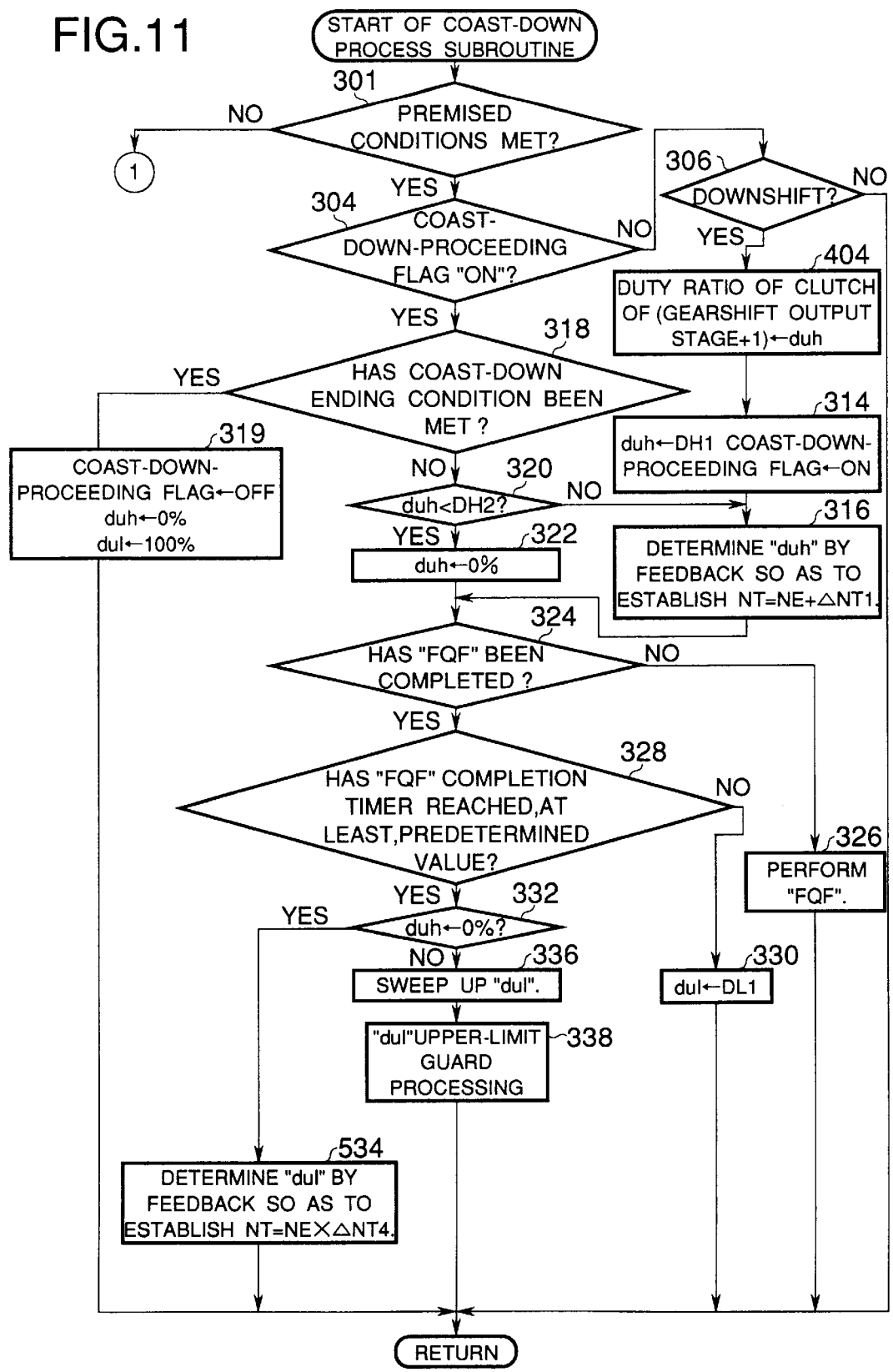
FIG. 11 is a flow chart showing a coast-down process subroutine for performing the third embodiment.

As shown in FIG. 10, according to the control of this embodiment, when the engine r.p.m. NE is constant, the turbine r.p.m. NT assumes substantially the same trace as in FIG. 1. However, when the engine r.p.m. NE has changed, the turbine r.p.m. NT changes so as to keep the ratio constant in this embodiment of FIG. 10 unlike the case of FIG. 1 where the turbine r.p.m. NT changes so as to keep constant the difference from the engine r.p.m. NE.

The other points are similar to those of the time chart of FIG. 1 or FIG. 8. Besides, the flow chart shown in FIG. 11 is the same as in the embodiments already described, except that a step 534 determines the duty ratio "dull" by feedback so as to keep $NT=NE \times \Delta NT4$. Therefore, the same steps shall be merely indicated by the same reference numerals and shall not be iteratively explained.

There will now be explained the processing①) in the case where the premised conditions have not been satisfied at the step 301 in FIG. 7, FIG. 9 or FIG. 11.

Figure 12:
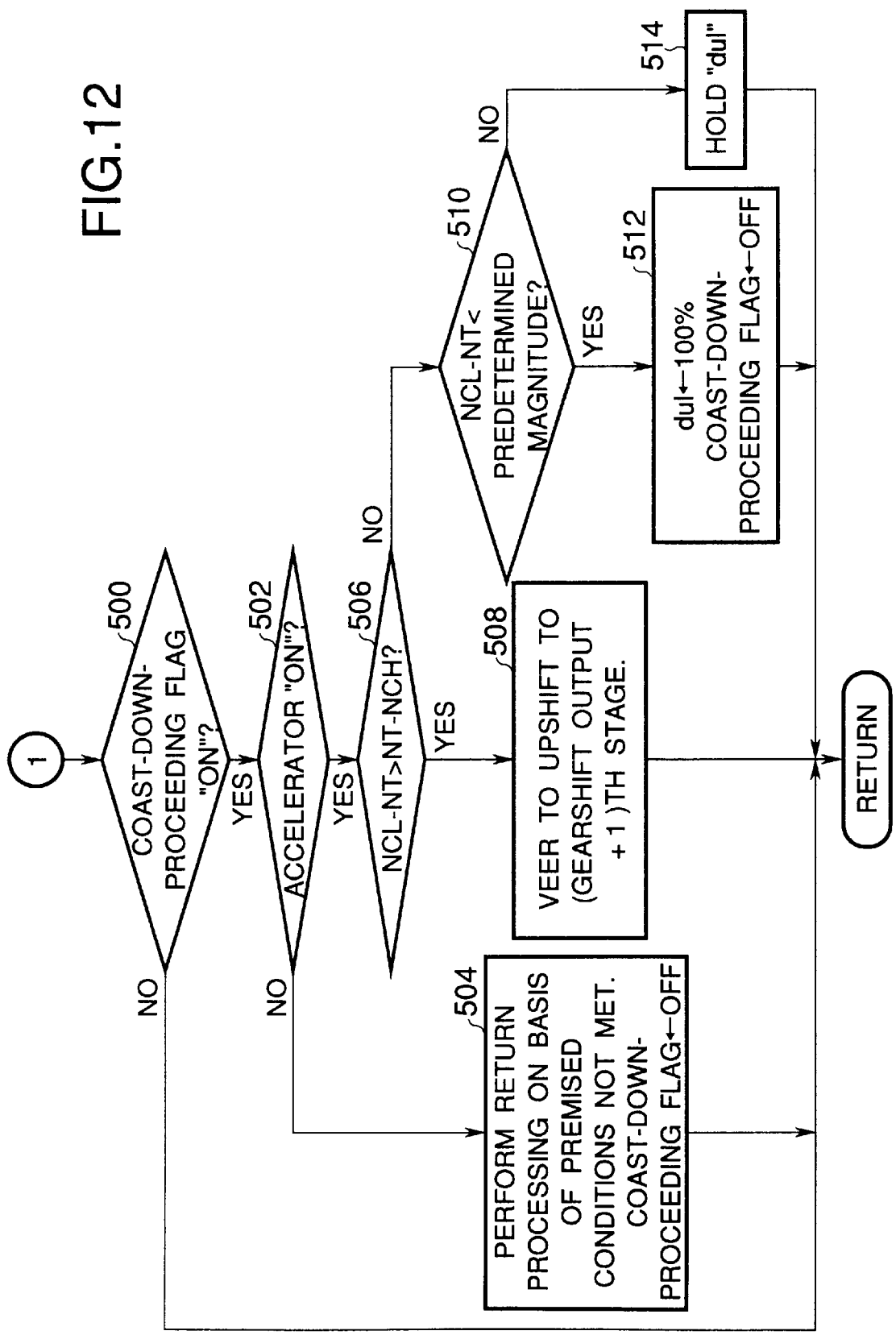
FIG. 12 is a flow chart showing a control in the case where premised conditions have not been satisfied in FIG. 7, FIG. 9 or FIG. 11.

In this case, the step 301 is followed by a step 500 in FIG. 12. The step 500 functions to judge whether or not the coast-down-proceeding flag is "ON". When the flag is not "ON", the control flow of the processing ① is directly returned (by deciding that the state is originally quite impertinent to the present invention). In contrast, when the flag is "ON", it is considered that the coast control according to the present invention has been performed till then. Therefore, the step 500 is followed by a step 502, which functions to judge whether or not the accelerator of the motor vehicle has been turned "ON". In a case where the accelerator has not been turned "ON", it is decided that the premised conditions are not met for any reason other than the turn-ON of the accelerator. At a step 504, accordingly, predetermined return processing is executed, and the coast-down-proceeding flag is turned "OFF".

On the other hand, when it is decided that the premised conditions are not met because of the turn-ON of the accelerator, the control flow advances to a step 506. At this step, the difference (NCL−NT) between the turbine r.p.m. NT at the current time and the synchronous r.p.m. NCL of the gearshift-output-stage side (lower-speed-stage side) is compared with the difference (NT−NCH) between the turbine r.p.m. NT and the synchronous r.p.m. NCH of the preceding-gearshift-stage side, and which of the differences is greater is judged. Here, subject to the judgement that the turbine r.p.m. NT is nearer to the synchronous r.p.m. NCH of the preceding gearshift stage (NCL−NT>NT−NCH), the control flow advances to a step 508. At this step, the coast control is veered to an upshift to the preceding gearshift stage, namely, the (Gearshift output +1)th stage, and the coast-down-proceeding flag is turned "OFF".

In contrast, subject to the judgement that the turbine r.p.m. NT is nearer to the synchronous r.p.m. NCL of the gearshift-output-stage side (NCL−NT≦NT−NCH), the control flow advances to a step 510, which checks whether or not the difference (NCL−NT) is less than a predetermined magnitude with which a gearshift shock is not problematic. When the difference (NCL−NT) is less, the lower-speed-stage side duty ratio "dul" " is set at 100%, and the coast-down-proceeding flag is turned OFF (step 512). Besides, when the difference (NCL−NT) is not less than the predetermined magnitude, the duty ratio "dul" is held (at the current value) at a step 514. In due course, when it is decided at the step 510 that the difference (NCL−NT) has become less than the predetermined magnitude owing to the holding at the step 514, the control flow advances to the step 512 at the point of time of the decision. As stated above, at the step 512, the lower-speed-stage side duty ratio "dul" is set at 100%, and the coast-down-proceeding flag is turned OFF. That is, in this case, the coast control is ended by settling the gearshift stage onto the lower-speed-stage side.

As thus far described, in the case where the premised conditions (predetermined conditions) have failed to be met, on account of pressing the accelerator, the coast control is ended on the basis of the routine as shown in FIG. 12. As a result, when the premised conditions have failed to be met, the gearshift stage can be settled to that one of the current gearshift output stage and the gearshift stage of (Current gearshift output stage+One stage) whose synchronous r.p.m. exhibits the smaller difference from the current input shaft r.p.m. of the automatic transmission, and the coast control can be ended with a light gearshift shock. Incidentally, when it has been judged at the step 506 that the current turbine r.p.m. NT is nearer to the synchronous r.p.m. of the gearshift-output-stage side (lower-speed-stage side), the control flow does not immediately advance to the step 512 so as to set the duty ratio "dul" at 100%, but it advances to the step 510 for checking if the difference (NCL−NT) is less than the predetermined magnitude (with which the gearshift shock is not problematic). This contrivance is advantageous as stated below. When the difference (NCL−NT) is not less than the predetermined magnitude, the control flow advances to the step 514 once. Here at the step 514, the duty ratio "dul" on that occasion is held. Owing to the holding, the difference (NCL−NT) is slowly diminished so as to become less than the predetermined magnitude. Since the input shaft r.p.m. NT is near to the synchronous r.p.m. of the gearshift-output-stage side, the clutch of the lower-speed-stage side already has a considerable capacity of transmission torque. Accordingly, the difference (NCL−NT) is slowly diminished by holding the duty ratio "dul" on that occasion. After the difference (NCL−NT) has become less than the predetermined magnitude, the duty ratio "dul" is brought up to 100%. Therefore, the coast control can be veered to the lower-speed-stage side with a very light gearshift shock.

Figure 13:
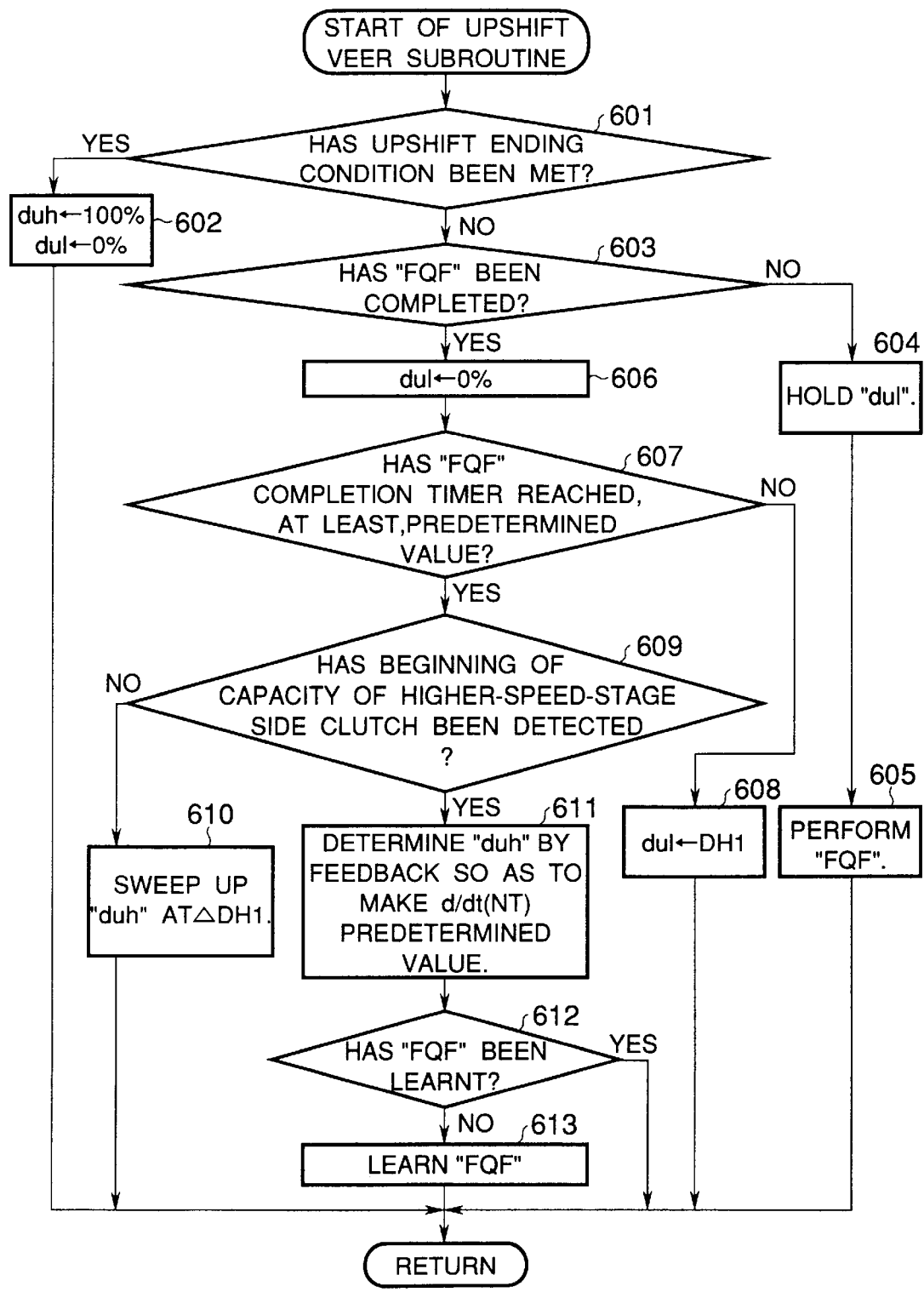
FIG. 13 is a flow chart showing a control in the case where a coast downshift is ended by veering to an upshift in FIG. 12.
Figure 14:
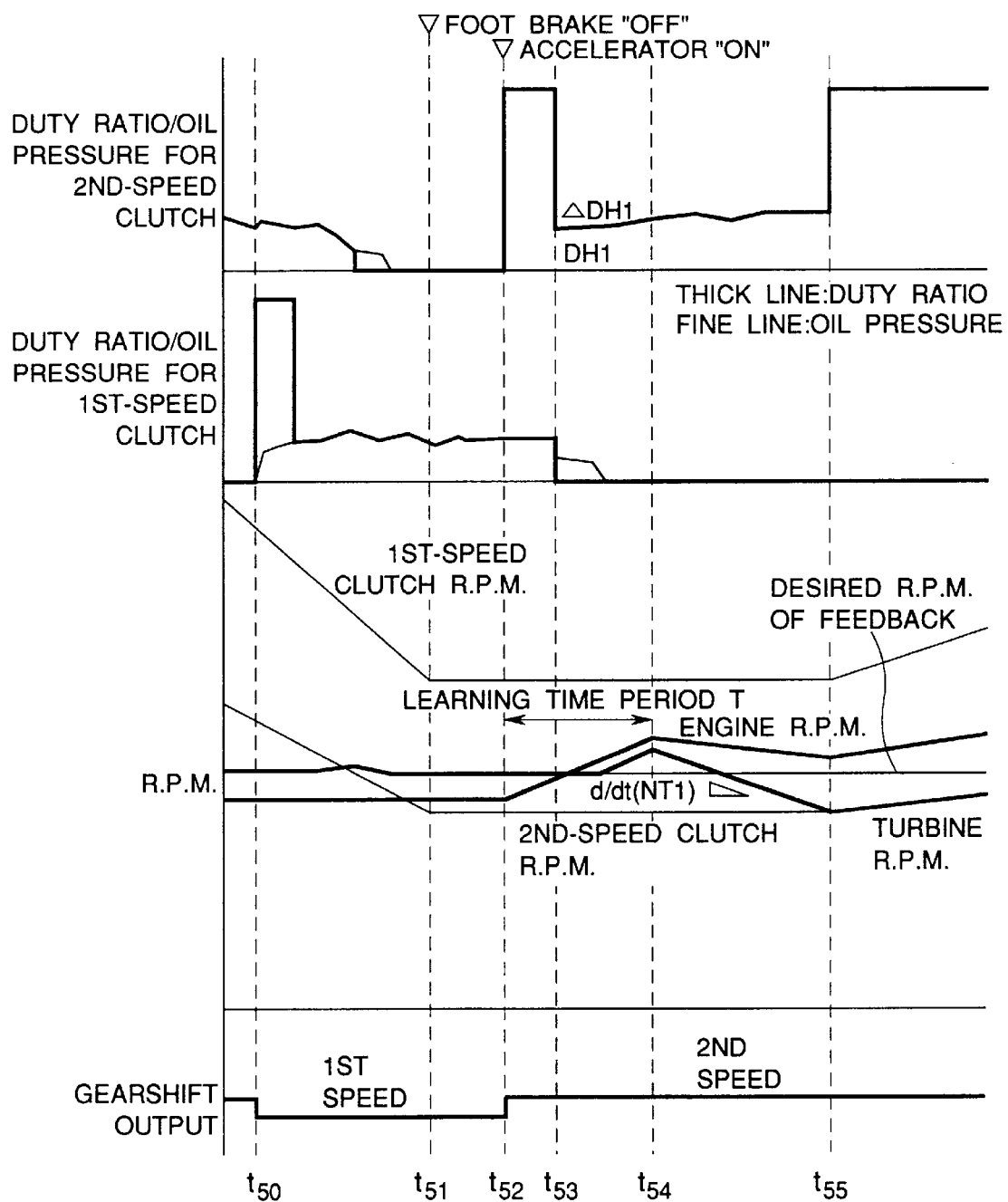
FIG. 14 is a time chart showing a control aspect which is performed in the case of the veer to the upshift.

Next, FIGS. 13 and 14 illustrate processing in the case where the coast control is ended by veering to the upshift at the step 508 in FIG. 12.

Whether or not a condition for ending the started upshift is satisfied, is judged at a step 601. The ending condition for the upshift is that the state in which the difference (NT−NCH) between the turbine r.p.m. NT and the synchronous r.p.m. NCH of the higher-speed-stage side is equal to or less than a predetermined magnitude has been detected continually for a predetermined time period. At the beginning of the veer to the upshift, it is judged that the ending condition is not met yet. Therefore, the control flow of the processing advances to a step 603, which judges whether or not the "first quick fill (FQF)" of the higher-speed-stage side clutch has been completed. If the FQF has not been completed yet, the duty ratio "dul" of the lower-speed-stage side is held at a step 604, and the FQF of the higher-speed-stage side clutch is executed (or the execution of the FQF is continued) at a step 605.

In due course, when the completion of the FQF is judged at the step 603, the duty ratio "dul" of the lower-speed-stage side is set at 0% (the oil pressure is fully drained) at a step 606, and whether or not a timer activated upon the completion of the FQF has reached a predetermined value is judged at a step 607. As long as the timer has not reached the predetermined value, the step 607 is followed by a step 608, at which the duty ratio "duh" of the higher-speed-stage side is maintained at a predetermined value DH1.

In due course, when it is judged at the step 607 that the timer has reached the predetermined value, the control flow advances to a step 609, which decides whether or not the higher-speed-stage side clutch has begun to have a transmission torque capacity. As long as it is not detected that the higher-speed-stage side clutch has begun to have the capacity, the duty ratio "duh" of the higher-speed-stage side is swept up (gradually increased) every ΔDH1 at a step 610. When it is detected at the step 609 that the higher-speed-stage side clutch has begun to have the capacity as the result of the sweep-up, the control flow advances to a step 611, at which the duty ratio "duh" of the higher-speed-stage side is determined by feedback in order that the falling rate d/dt (NT) of the turbine r.p.m. NT may become a predetermined value. Incidentally, whether or not the higher-speed-stage side clutch has begun to have the transmission torque capacity is decided on the basis of, for example, the fact that the rising rate of the turbine r.p.m. NT becomes a minus value (the turbine r.p.m. NT diverts to fall) or the fact that the turbine r.p.m. NT under the control has arrived at a value which is smaller than its maximum value by a predetermined magnitude.

Meanwhile, on this occasion, steps 612 and 613 operate to check the period of time (a term T from a time t52 to a time t54 in FIG. 14) expended until the higher-speed-stage side clutch began to have the capacity since the execution of the FQF for this clutch.

The execution of the upshift in this embodiment is started from the state in which the clutch of the higher-speed-stage side is fully released. Therefore, whether or not the time period of the execution of the FQF was appropriate can be confirmed very accurately by checking the term expended until the higher-speed-stage side clutch began to have the capacity since the execution of the FQF. Concretely, if the time period of the FQF is shorter relative to the optimum value, the term T becomes longer. It is therefore possible to learn that the time period of the FQF for the pertinent clutch at the next time, et seq. ought to be corrected longer. In contrast, if the time period of the FQF is longer relative to the optimum value, the term T becomes shorter. On this occasion, accordingly, it is possible to learn that the time period of the FQF for the pertinent clutch ought to be corrected shorter. Herein, if the time period of the FQF is drastically longer relative to the optimum value, it is sometimes the case that the pertinent clutch is suddenly endowed with a transmission torque capacity in the course of the FQF, resulting in a gearshift shock. In this regard, learning may well be so executed that, when such a situation has been detected because of, for example, the fluctuation of the output shaft r.p.m. of the automatic transmission, the time period of the FQF for the pertinent clutch at the next time, et seq. is shortened much.

Here, further reference will be made to learning. In the present invention, the clutch of the lower-speed-stage side is feedback-controlled so as to keep the weak engine-braking state. Therefore, although no illustration is made, the duty ratio with which the pertinent clutch has the very limit capacity (transmission torque capacity) can be known very accurately (with a weak engine-braking component removed) by checking what degree of duty ratio "duh" is outputted for holding the weak engine braking. Particularly in the case where the lower-speed-stage side clutch is feedback-controlled using (Engine r.p.m. NE+Predetermined magnitude ΔNT1) or (Engine r.p.m. NE×Predetermined magnitude ΔNT4) as the desired value, the duty ratio with which the pertinent clutch has the very limit capacity can be accurately found in correspondence with the easy cancellation of the weak engine-braking component. In the automatic transmission in which a predetermined gearshift is executed by the clutch-to-clutch gearshift, the control is frequently performed in which, until one clutch falls into a predetermined state, the other clutch stands by at the pressure value with which it has the very limit capacity (or with which it does not have the very limit capacity). Herein, if the standby pressure is not proper, the control itself might fail to proceed favorably. In the present invention, the time period for which the motor vehicle is kept in the weak engine-braking state is comparatively long because of the construction of the invention. It is therefore possible to very accurately detect and confirm the duty ratio corresponding to the oil pressure with which the pertinent clutch has the very limit capacity. It can be accordingly said that the present invention has the optimum condition as a "field" for executing this sort of learning.

Lastly, let's consider a situation where, when the motor vehicle has been rapidly decelerated with braking in the application of the present invention to the coast downshift of the automatic transmission having the synchro mechanism as stated before, the switchover operation of the synchro mechanism has relatively delayed, resulting in difficulty in keeping the weak engine-braking state of the present invention. A countermeasure to be taken against the occurrence of the situation will now be described.

Figure 15:
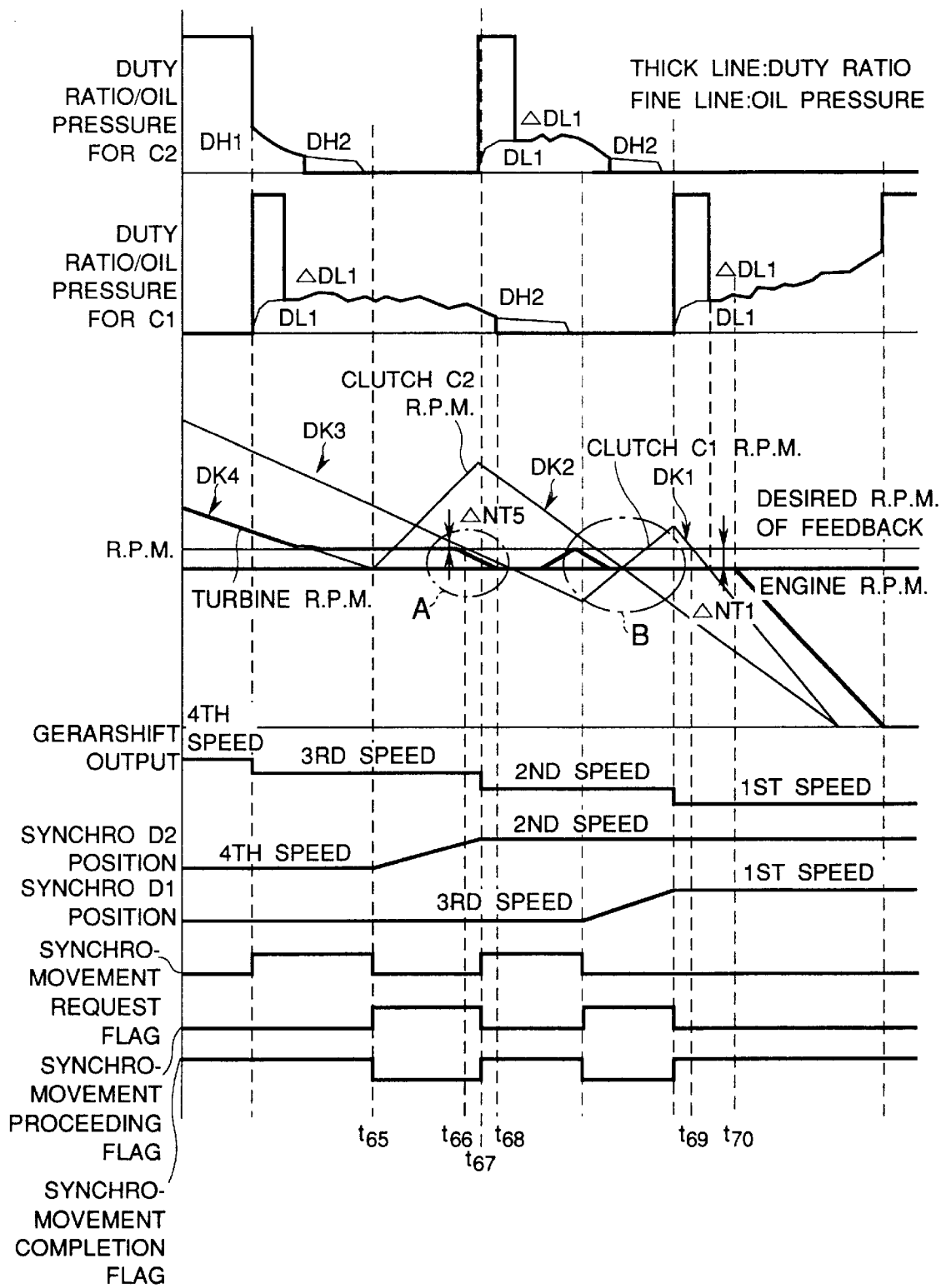
FIG. 15 is a time chart showing a control aspect which is performed when the switchover of a synchro mechanism has been missed in a case where a motor vehicle has been suddenly decelerated in the application of the present invention to an automatic transmission having the synchro mechanism.

FIG. 15 illustrates a time chart concerning a control in the situation. Here in FIG. 15, the graduations of the time axis (the axis of abscissas) are indicated on an enlarged scale with respect to those in FIG. 1, etc. in order to be easily seen. A time period for the switchover of the synchro mechanism and a time period for the execution of the "first quick fill (FQF)" are accordingly indicated in the state in which they are prolonged in the direction of the axis of abscissas with respect to those in FIG. 1. In the case of the rapid deceleration, the synchro switchover of the 4th speed→2nd speed is initiated at a time t65. In this regard, under the rapid deceleration, the lowering of the r.p.m. of the clutch C1 (the lowering rate of the synchronous r.p.m. DK3 of the third speed stage) is relatively fast (great). Accordingly, the synchronous r.p.m. of the current gearshift stage sometimes becomes less than the desired value at a time t67 at which the next gearshift output (the gearshift output for the second speed stage) is delivered upon the termination of the synchro switchover. In this case, when the present invention is continued as it is (of course, it may well be continued), a gearshift shock occurs at the point of time t66 at which the turbine r.p.m. NT has arrived at the synchronous r.p.m. of the current gearshift stage in due course. Thenceforth, the turbine r.p.m. NT lowers along the synchronous r.p.m. (even if the duty ratio "dul" of the lower-speed-stage side clutch is increased by the feedback control). Therefore, when the turbine r.p.m. NT has further lowered to fall below the engine r.p.m. NE, the drawback is apprehended that the drive state of the motor vehicle is temporarily brought about.

In order to prevent the drawback, therefore, when the synchronous r.p.m. of the current gearshift stage has become less than the desired value with a predetermined magnitude added thereto (in this embodiment, a value expressed by the desired value+$\Delta$NT5), on account of the delay of the switchover of the synchro mechanism as is ascribable to the rapid deceleration, the desired value is gradually decreased down to (Synchronous r.p.m.$-\Delta$NT5) so as to be changed over to the new desired value with which the motor vehicle falls into the neutral state temporarily. As a result, when the desired value has lowered to come into agreement with the engine r.p.m. NE (a time t68), the desired value=the engine r.p.m. NE holds true.

In this way, even when the switchover of the synchro mechanism has relatively delayed due to the rapid deceleration, the shock at the agreement of the turbine r.p.m. with the synchronous r.p.m. can be prevented, and besides, the establishment of the drive state can be reliably prevented.

Meanwhile, in a case where the gearshift output stage is the first speed stage, circumstances are somewhat different. The reasons therefor are as follows: Since the first speed stage has no further downshift, it is improper to eternally leave the first-speed-stage clutch (clutch C1 in this embodiment) in a slip state, and the turbine r.p.m. cannot avoid lowering with the fall of the synchronous r.p.m. of the first speed stage when the first-speed-stage clutch has come into perfect engagement. Moreover, in case of an abrupt deceleration, inevitably the turbine r.p.m. lowers abruptly.

In this embodiment, therefore, when the synchronous r.p.m. DK1 of the first speed stage has become less than the desired value (in this embodiment, NE+$\Delta$NT1) in the state of the gearshift output for the first speed stage on account of that delay of the switchover of the synchro mechanism which is ascribable to the rapid deceleration, the desired value is changed over to a new desired value with which the decreasing rate of the turbine r.p.m. NT can be made smaller. Concretely, after the inequality (NCL<NE+$\Delta$NT1) has been satisfied, the first-speed-stage clutch is somewhat slipped. Thus, the new desired value with which the decreasing rate d/dt(NT) of the turbine r.p.m. NT becomes constant is used in order to make the decreasing rate smaller.

In the example of FIG. 15, however, the first clutch C1 is undergoing the "first quick fill" at the point of time at which the inequality (NCL<NE+$\Delta$NT1) has been met. Therefore, it is after a time t70 that the desired value is altered in order to make the decreasing rate d/dt(NT) of the substantial turbine r.p.m. NT constant.

In this way, even in such a case where the switchover of the synchro mechanism has delayed due to the rapid deceleration, it can be deferred to the utmost that the motor vehicle falls into the drive state, and the abrupt decrease of the turbine r.p.m. can be prevented in spite of the rapid deceleration.

Figure 16:
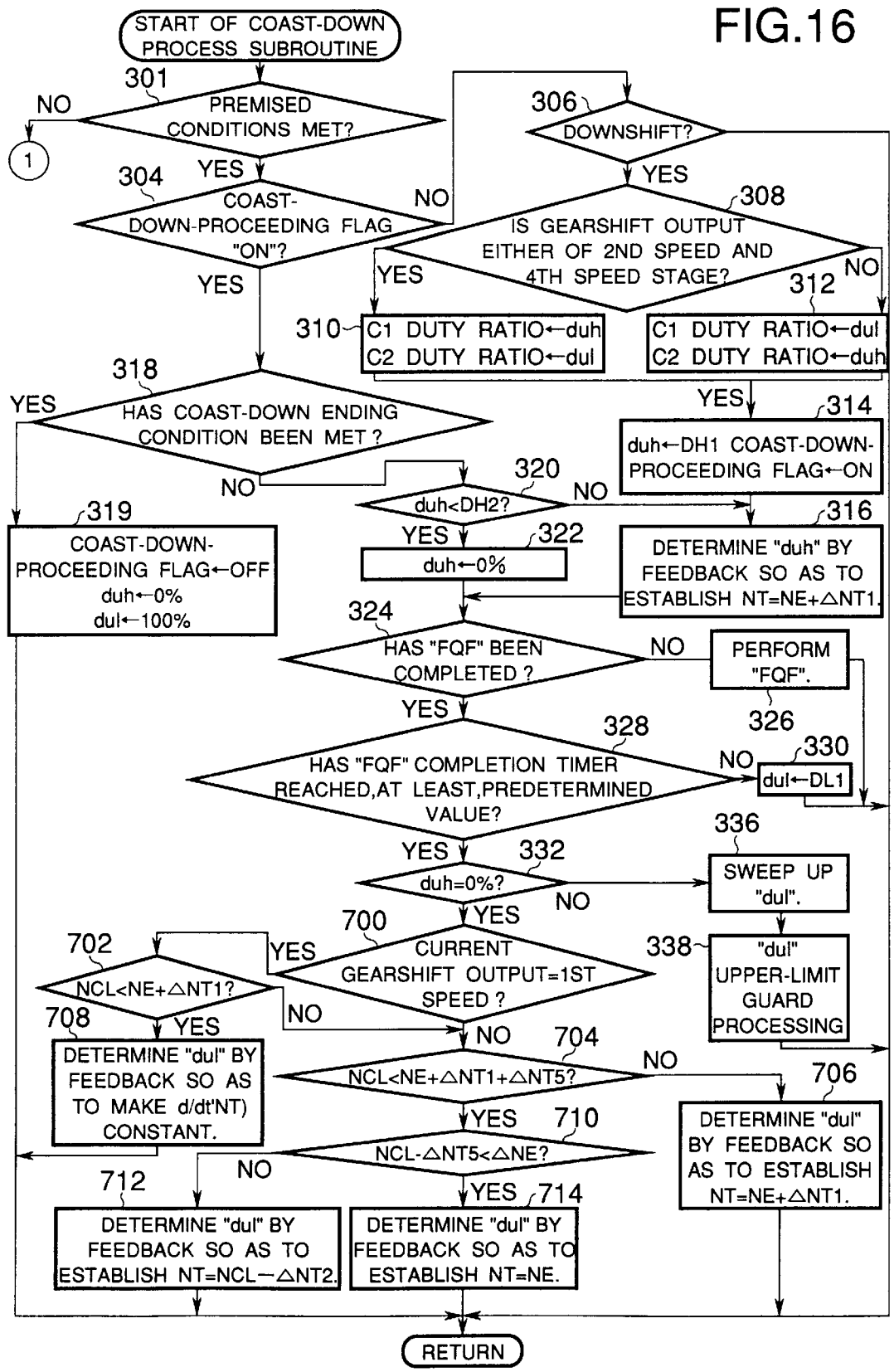
FIG. 16 is a flow chart showing a coast-down process subroutine for performing the control shown in FIG. 15.

A flow for concretizing the control is illustrated in FIG. 16. In the figure, the steps 301~332 are the same as in the control flow of FIG. 7 already explained. In the flow chart of FIG. 7, when it has been judged at the step 332 that the duty ratio "duh" of the lower-speed-stage side is 0%, the control flow merely advances to the step 334, at which the duty ratio "dul" is determined by the feedback so as to establish NT=NE+$\Delta$NT1. In contrast, according to the flow chart of FIG. 16, the control explained above with reference to FIG. 15 is incarnated in the ensuing way. A step 700 functions to judge whether or not the current gearshift output indicates the first speed. In a case where the first speed is not indicated, whether or not the synchronous r.p.m. NCL of the lower-speed-stage side is less than a value (NE+$\Delta$NT1+$\Delta$NT5) is decided at a step 704. If the synchronous r.p.m. NCL is not less than the value (NE+$\Delta$NT1+$\Delta$NT5), the control flow advances to a step 706, at which the duty ratio "dul" of the lower-speed-stage side is determined by a feedback control so as to establish NT=NE+$\Delta$NT1 in accordance with the basic control (the same operation as at the step 334 in FIG. 7).

However, if the inequality (NCL<NE+$\Delta$NT1+$\Delta$NT5) has been met at the step 704, this step is followed by a step 710, which functions to judge whether or not an inequality (NCL−$\Delta$NT5<NE) is satisfied. As long as the inequality (NCL−$\Delta$NT5<NE) is not met, the control flow advances to a step 712, at which the duty ratio "dul" of the lower-speed-stage side is determined by feedback so as to establish NT=NCL−$\Delta$NT5. When the inequality (NCL−$\Delta$NT5<NE) has been met, the control flow advances to a step 714, at which the duty ratio "dul" is determined by feedback so as to establish NT=NE.

On the other hand, when it has been detected at the step 700 that the current gearshift output indicates the first speed stage, the control flow advances to a step 702, which functions to judge whether or not an inequality (NCL<NE+$\Delta$NT1) is satisfied. As long as the inequality (NCL<NE+$\Delta$NT1) is not met at the step 702, this step is followed by the step 704, at which the processing already explained is executed. When the inequality (NCL<NE+$\Delta$NT1) has been met, the control flow advances to a step 708, at which the duty ratio "dul" is determined by feedback so as to make the decreasing rate d/dt(NT) constant.

Owing to the above control flow, the characteristics as shown in FIG. 15 can be attained. Accordingly, even in such a case where the switchover of the synchro delays due to the rapid deceleration, it is permitted to avoid the gearshift shock arising when the turbine r.p.m. has arrived at the synchronous r.p.m., and to prevent the motor vehicle from falling into the drive state, to the utmost.

As thus far described, according to the present invention, a coast downshift based on a clutch-to-clutch gearshift can be reasonably realized without generating any excessive engine-braking force and without involving any heavy gearshift shock.

What is claimed is:

1. A coast downshift control apparatus in a vehicular automatic transmission in a motor vehicle, the automatic transmission having a plurality of clutches, wherein a coast downshift is executed under predetermined conditions by a clutch-to-clutch gearshift which is achieved by engagement of a gearshift output stage side clutch and release of a preceding gearshift stage side clutch, comprising:

means for judging whether or not said predetermined conditions for executing the coast downshift are satisfied;

means for setting a desired value for a predetermined parameter in order that a motor vehicle furnished with said automatic transmission will be kept in a substantially constant engine-braking state; and means for performing during said coast conditions a coast control in which an oil pressure to be fed to said gearshift-output-stage side clutch is feedback controlled so that said predetermined parameter will substantially agree with the desired value.

2. A coast downshift control apparatus in for a vehicular automatic transmission as defined in claim 1, wherein after a state where said desired value is unattainable has been reached, said coast control based on said desired value is continued as long as said coast conditions continue.

3. A coast downshift control apparatus in a vehicular automatic transmission as defined in claim 1, wherein input shaft speed of said automatic transmission is employed as said predetermined parameter, and a value which is higher than a speed of an engine of the motor vehicle by a predetermined value is set as said desired value of the input shaft speed.

4. A coast downshift control apparatus in a vehicular automatic transmission as defined in claim 1, wherein input shaft speed of said automatic transmission is employed as said predetermined parameter, and a value which is lower than synchronous speed of the gearshift output stage by a predetermined value is set as said desired value of the input shaft speed, said synchronous speed being calculated in accordance with (Output shaft speed of Automatic transmission)×(Gear ratio of Gearshift output stage).

5. A coast downshift control apparatus in a vehicular automatic transmission as defined in claim 1, wherein a speed ratio of a torque converter of said automatic transmission is employed as said predetermined parameter, and a predetermined value which is larger than 1 (one) is set as said desired value of the speed ratio.

6. A coast downshift control apparatus in a vehicular automatic transmission as defined in claim 1, wherein a coast control based on said desired value is performed by said preceding-gearshift-stage side clutch since issue of a gearshift output of said automatic transmission until said gearshift-output-stage side clutch comes to have a predetermined transmission torque capacity, and the coast control is thereafter performed by said gearshift-output-stage side clutch.

7. A coast downshift control apparatus in a vehicular automatic transmission as defined in claim 1, wherein when said predetermined conditions are not satisfied any longer on account of pressing an accelerator pedal of the motor vehicle, a gearshift is executed to the gearshift stage of either the current gearshift output stage or (said current gearshift output stage+one stage) whose synchronous speed exhibits a smaller difference from the current input shaft speed of said automatic transmission.

8. A coast downshift control apparatus in a vehicular automatic transmission as defined in claim 1, wherein when said predetermined conditions are not satisfied any longer because of a new upshift having occurred, an engagement timing is learnt as to the higher-speed-stage side clutch which has been in its released state as the preceding-gearshift-stage side clutch till then and which is to be engaged again anew.

9. A coast downshift control apparatus in a vehicular automatic transmission as defined in claim 1, wherein standby pressures concerning the engagement and release of said clutch are learnt on the basis of a duty ratio of said gearshift-output-stage side clutch which is under said coast control based on said desired value.

10. A coast downshift control apparatus in a vehicular automatic transmission as defined in claim 3, said automatic transmission having a synchro mechanism, wherein when synchronous speed of the current gearshift stage, which is calculated in accordance with (Output shaft r.p.m. of Automatic transmission)×(Gear ratio of Current gearshift output stage), has become less than said desired value with a predetermined magnitude added thereto, because of a delay of switchover of said synchro mechanism due to a rapid deceleration, said desired value is temporarily changed over to another desired value with which the automatic transmission falls into a neutral state.

11. A coast downshift control apparatus in a vehicular automatic transmission as defined in claim 4, said automatic transmission having a synchro mechanism, wherein when synchronous speed of the current gearshift stage, which is calculated in accordance with (Output shaft r.p.m. of Automatic transmission)×(Gear ratio of Current gearshift output stage), has become less than said desired value with a predetermined magnitude added thereto, because of a delay of switchover of said synchro mechanism due to a rapid deceleration, said desired value is temporarily changed over to another desired value with which the automatic transmission falls into a neutral state.

12. A coast downshift control apparatus in a vehicular automatic transmission as defined in claim 3, said automatic transmission having a synchro mechanism, wherein when synchronous speed of a first speed stage, which is calculated in accordance with (Output shaft speed of Automatic transmission)×(Gear ratio of First speed stage), has become less than said desired value in a gearshift output state toward the first speed stage, because of a delay of switchover of the synchro mechanism due to a rapid deceleration, said desired value is changed over to a desired value with which a decreasing rate of said input shaft speed of said automatic transmission can be reduced.

13. A coast downshift control apparatus in a vehicular automatic transmission as defined in claim 4, said automatic transmission having a synchro mechanism, wherein when synchronous speed of a first speed stage, which is calculated in accordance with (Output shaft speed of Automatic transmission)×(Gear ratio of First speed stage), has become less than said desired value in a gearshift output state toward the first speed stage, because of a delay of switchover of the synchro mechanism due to a rapid deceleration, said desired value is changed over to a desired value with which a decreasing rate of said input shaft speed of said automatic transmission can be reduced.

* * * * *